US012632227B2

(12) United States Patent
Ruelle et al.

(10) Patent No.: US 12,632,227 B2
(45) Date of Patent: May 19, 2026

(54) FLEXIBLE CONFIGURATION COMPONENTS

(71) Applicant: STMicroelectronics International N.V., Geneva (CH)

(72) Inventors: Frederic Ruelle, Marigné-Laillé (FR); Yohann Martiniault, Val D'Ize (FR); Bechir Jabri, Ariana (TN); Maher Mastouri, Ariana (TN); Laurent Meunier, Coulaines (FR); Emmanuel Grandin, Villeneuve-en-Retz (FR); Maxime Dortel, Grasse (FR)

(73) Assignee: STMicroelectronics International N.V., Geneva (CH)

( * ) Notice: Subject to any disclaimer, the term of this patent is extended or adjusted under 35 U.S.C. 154(b) by 119 days.

(21) Appl. No.: 18/783,054

(22) Filed: Jul. 24, 2024

(65) Prior Publication Data

US 2025/0036428 A1    Jan. 30, 2025

Related U.S. Application Data

(60) Provisional application No. 63/573,844, filed on Apr. 3, 2024, provisional application No. 63/516,444, filed on Jul. 28, 2023.

(51) Int. Cl.
*G06F 9/445* (2018.01)
*G06F 3/0482* (2013.01)
(Continued)

(52) U.S. Cl.
CPC .............. *G06F 8/34* (2013.01); *G06F 3/0482* (2013.01); *G06F 8/77* (2013.01); *G06F 9/44505* (2013.01)

(58) Field of Classification Search
CPC .. G06F 9/44505; G06F 9/44521; G06F 9/451; G06F 9/44526; G06F 9/44542;
(Continued)

(56) References Cited

U.S. PATENT DOCUMENTS 5,812,394 A     9/1998 Lewis et al.
7,433,932 B2    10/2008 Eifler et al.
(Continued)

OTHER PUBLICATIONS

Francesco Renzini et al., "A Fully Programmable eFPGA-Augmented SoC for Smart Power Applications", Aug. 7, 2019, IEEE Transactions on Circuits and Systems, vol. 67, No. 2 pp. 489-501 (Year: 2019).
(Continued)

*Primary Examiner* — Raymond N Phan
(74) *Attorney, Agent, or Firm* — Seed IP Law Group LLP

(57) ABSTRACT

Content is generated for a programmable computing device based on user-selected configuration information. The user-selected configuration information includes a user-selected versatile component. User-selectable versatile component configuration options for the user-selected versatile component are presented and versatile component configuration option selections for the user-selected versatile component are received. Settings for an instance of the user-selected versatile component are generated based on the received component configuration option selections. A configuration store is generated or updated based on the settings for the user-selected versatile component. Content for the programmable computing device is generated based on the configuration store. Generating the content includes associating the instance of the user-selected versatile component with a software component, with a hardware component, or combinations thereof, based on one or more of the received versatile component configuration option selections. The
(Continued)

generated content is provided to the programmable computing device.

33 Claims, 28 Drawing Sheets

(51) Int. Cl.
  *G06F 8/34* (2018.01)
  *G06F 8/77* (2018.01)
(58) Field of Classification Search
  CPC ............... G06F 3/0482; G06F 11/1415; G06F 11/1402; G06F 11/14; G06F 11/1471
  See application file for complete search history.

(56) References Cited

U.S. PATENT DOCUMENTS

| | | | |
|---|---|---|---|
| 8,135,884 | B1 | 3/2012 | Sullam et al. |
| 8,592,722 | B2 | 11/2013 | Ulrich et al. |
| 8,661,401 | B1 | 2/2014 | Ogami et al. |
| 8,701,080 | B2 | 4/2014 | Tripathi |
| 9,250,299 | B1 | 2/2016 | Yarlagadda et al. |
| 9,650,141 | B2 | 5/2017 | Fagan et al. |
| 10,162,630 | B2 * | 12/2018 | Bouley ..................... G06F 8/60 |
| 10,643,020 | B1 | 5/2020 | Kukal et al. |
| 10,739,949 | B2 | 8/2020 | Lattore Costa |
| 11,316,733 | B1 | 4/2022 | Johnson et al. |
| 12,093,201 | B2 * | 9/2024 | Le Corre ........... G06F 9/44505 |
| 2006/0164453 | A1 | 7/2006 | Silverbrook et al. |
| 2007/0130548 | A1 | 6/2007 | Zhaksilikov et al. |
| 2007/0165765 | A1 | 7/2007 | Ogami et al. |
| 2008/0244520 | A1 | 10/2008 | Hashimoto et al. |
| 2009/0094539 | A1 | 4/2009 | Wang et al. |
| 2009/0125129 | A1 * | 5/2009 | Eldridge ................ G05B 15/02 700/86 |
| 2014/0323182 | A1 | 10/2014 | Kim et al. |
| 2016/0149761 | A1 * | 5/2016 | Liu ..................... H04L 41/0889 709/221 |
| 2016/0267046 | A1 | 9/2016 | Kris et al. |
| 2018/0225230 | A1 | 8/2018 | Litichever et al. |
| 2019/0079575 | A1 | 3/2019 | Hanson et al. |
| 2020/0125060 | A1 | 4/2020 | Fujimura |
| 2020/0387352 | A1 | 12/2020 | Chawla et al. |
| 2020/0387357 | A1 | 12/2020 | Mathon et al. |
| 2020/0396225 | A1 | 12/2020 | Bhatia et al. |
| 2021/0209003 | A1 | 7/2021 | Kowkutla et al. |
| 2022/0261139 | A1 | 8/2022 | Phoutchanthavongsa et al. |
| 2023/0075227 | A1 | 3/2023 | Grandin et al. |
| 2023/0078144 | A1 | 3/2023 | Ruelle et al. |
| 2023/0080696 | A1 | 3/2023 | Ruelle et al. |
| 2023/0259474 | A1 | 8/2023 | Le Corre |
| 2023/0342476 | A1 | 10/2023 | Ziecik et al. |
| 2025/0036374 | A1 | 1/2025 | Dortel et al. |

OTHER PUBLICATIONS

T. Giuma et al., "Programmable Hardware and the New Analog Capacity", Apr. 1, 2007, International Conference on Systems, pp. 1-6 (Year: 2007).

Amaury Bruniaux et al., "Towards a Fully Programmable Internet of Things", Oct. 10, 2022, 18th International Conference on Wireless and Mobile Computing—Networking and Communications, pp. 204-210 (Year: 2022).

M. Martina et al., "A new approach to compress the configuration information of programmable devices", Jan. 1, 2006, Proceedings of Design Automation & Test in Europe Conference, vol. 2, pp. 1-4 (Year: 2006).

* cited by examiner

*400*

START

402 — Present user interface of project to user

404 — Receive change in configuration store value

406 — Propagate change through configuration store

408 — Update user interface with propagated changes

410 — Project associated with other project?

No

Yes

412 — Propagate change through configuration store of other project

_500_

```
{
    "blocks" : {
        "configs":{
            "label" : "Configuration",
            "fields" : {
                "label": {
                    "label" : "Name",
                    "type": "string",
                    "minLength": 3,
                    "maxLength": 8,
                    "help_text": "name of the configuration",
                    "default": "none"
                },
                "frequency":{
                    "label":"Frequency",
                    "type": "number",
                    "minimum": 0,
                    "maximum": { "expr": "getGlobal().bus_clock" },
                    "unit": "Hz",
                    "description": "Specifies frequency used to compute
the period value to be loaded into the active Auto-Reload Register at the
next update event.",
                    "help_text": "In the header file : ARR = (TIM1
counter clock / TIM1 output clock)-1"
                },
                "DCH1":{
                    "label":"DutyCycleCH1",
                    "type": "number",
                    "minimum": 0,
                    "maximum": 100,
                    "unit": "%",
                    "description": "Specifies the duty cycle for channel
1 of the timer.",
                    "help_text": "The tool converts it into a pulse
value, pulse value = period * duty cycle / 100"
                },
                "DCH2":{
                    "label" : "DutyCycleCH2",
                    "type": "number",
                    "minimum": 0,
                    "maximum": 100,
                    "unit": "%",
                    "description": "Specifies the duty cycle for channel
2 of the timer.",
                    "help_text": "The tool converts it into a pulse
value, pulse value = period * duty cycle / 100"
                }
            }
        }
    }
}
```

_FIG. 5_

_600_

```
{
        "id" : "::Device:Application:HAL Examples",
    "resources": {
        "pwm_led_dimmer": {
            "resource_query": {
                "type": "driver(hal,tim)"
            },
            "description": "Timer instance",
            "help_text": "choose Timer instance",
            "source": "Parameters from Figure 5.json"
        }
    },
    "overlay": {
        "pwm_led_dimmer": {
            "id" : "::Device:EXAMPLE_PROCESSOR HAL Code Gen:TIM Init",
            "resource_query": {
                "criteria": [
                    "advanced = true",
                    "prescaler > 10",
                    "COUNT_CHANNEL_WITH('pwm')=4"
                ],
                "default": "TIM4"
            },
            "blocks": {
                "configs": {
                    "fields": {
                        "[Period]":
"(self.resources.pwm_led_dimmer.resource.%counter_clock% /
self.resources.pwm_led_dimmer.blocks.configs.%current_config%.fields.fre
quency)-1",
                        "ConfigOC": {
                            "CH1": {
                                "[Pulse]":
"(self.resources.pwm_led_dimmer.blocks.configs.%current_config%.fields.D
CH1 * %this%.Period) / 100"
                            },
                            "CH2": {
                                "[Pulse]":
"(self.resources.pwm_led_dimmer.blocks.configs.%current_config%.fields.D
CH2 * %this%.Period) / 100"
                            }
                        }
                    }
                }
            }
        }
    }
}
```

_FIG. 6_

1200

```
Loop on components call hook: returns a structure S loop on returned structure S entries invoke generation(template, filename, data)

end

End
```

HwInstanceList = getHWInstanceList('componentID:ywID')

Loop on HwInstanceList

Loop on template outputFileName=template.replace('_template',_hwinstance)

end loop

End

Return [

```
{id:'x', resource:'xx', filename:'xxx', template:"xxxx"}
{id:'y', resource:'yy', filename:'yyy', template:"yyyy"}
....
```

```
{
  "id": ":.Utility:Debug:trace-strategy", // identifies the strategy
  "generation": "forced", // generate even if nothing changed in the configuration data
  "check": "C11", // applies a checker to verify that the generated code is C11 compliant
  "template_groups": [
    {
      "group": "trace_uart", // identifies the first set of template files to be grouped
      "templates": [
        {
          "file": "trace_uart_template.c.hbs", // file
          "input param1": "UART1", // input parameter used by the file in addition to the configuration data
          "output": "../my_trace/trace.c", // file to generate
          "output_mode": "create_file" // create the output file
        },
        {
          "file": "trace_uart_template.h.hbs",
          "input param1": "UART1",
          "output": "../my_trace/trace.h",
          "output_mode": "create_file"
        },
        {
          "file": "trace_common.c.hbs",
          "input param1": "uart",
          "input param2": "iteraterm",
          "output": "../my_trace/trace.c",
          "output_mode": "append_file" // append to existing output file
        }
        ...
      ]
    },
    {
      "group": "trace_itm",
      "templates": [
        {
          "file": "trace_itm_template.c.hbs", // file
          "input param1": "#ifdef ITM_TRACE", // input parameter used by the file in addition
                                                // to the configuration data
          "output": "../my_trace/trace.c",
          "output_mode": "append_file"
        },
        {
          "file": "trace_itm_template.h.hbs",
          "input param1": "",
          "output": "../my_trace/trace.h",
          "output_mode": "append_file"
        }
      ]
    }
  ]
}
```

*FIG. 15*

```
|__ project1
|   |__ Inc
|   |__ Src
|   |__ codegen
|       |__ my_trace
|           |__ trace.c
|           |__ trace.h
```

1600

1700

```
{
  "id": "::Utility:Debug:trace-strategy", // identifies the strategy
  "generation": "forced", // generate even if nothing changed in the configuration data
  "check": "C11", // applies a checker to verify that the generated code is C11 compliant
  "template_groups": [
    {
      "group": "trace_uart", // identifies the first set of template files to be grouped
      "templates": [
        {
          "file": "trace_uart_template.c.hbs", // file
          "input param1": "UART1", // input parameter used by the file in addition to the configuration data
          "output": "../my_trace/trace.c", // file to generate
          "output_mode": "create_file" // create the output file
        },
        {
          "file": "trace_uart_template.h.hbs",
          "input param1": "UART1",
          "output": "../my_trace/trace.h",
          "output_mode": "create_file"
        },
        {
          "file": "trace_common.c.hbs",
          "input param1": "uart",
          "input param2": "teraterm",
          "output": "../my_trace/trace_common.c",
          "output_mode": "create_file" // append to existing output file
        }
      ]
    },
    {
      "group": "trace_itm",
      "templates": [
        {
          "file": "trace_itm_template.c.hbs", // file
          "input param1": "#ifdef ITM_TRACE", // input parameter used by the file in addition
                                                    to the configuration data
          "output": "../my_trace/trace.c",
          "output_mode": "append_file"
        },
        {
          "file": "trace_itm_template.h.hbs",
          "input param1": "",
          "output": "../my_trace/trace.h",
          "output_mode": "append_file"
        }
      ]
    }
  ]
}
```

*FIG. 17*

```
|- project2
|    |- Inc
|    |- Src
|    '- codegen
|         '- my_trace
|              |- trace.c
|              |- trace.h
|              '- trace_common.c
```

Example Versatile Component Configuration Graphical User Interface

△ Cellular

△ Wi-Fi                    △ Encryption

▽ Serial Communcations

Versatile Component
Instance Name:          HW UxART Inst 1    ▷            ▷ Basic
                                                         Parameters:

API:          HAL    ▷                      Clock
              LL                            Rate:

Protocol:     Sync   ▷                      Baud
              Async                         Rate:

Word
                                            Length:

FLEXIBLE CONFIGURATION COMPONENTS

BACKGROUND

Technical Field

The present disclosure generally relates to electronic circuits, such as of the type often used in embedded applications. More particularly, but not exclusively, the present disclosure relates to generating content for use in programming such electronic circuits, such as general purpose and application specific microcontrollers and microprocessors, including content related to configuration of components of the electronic circuits.

Description of the Related Art

Many programmable microcontroller and microprocessor architectures utilize specific code to initialize or configure operation of the microcontroller and microprocessor in a manner desired by the user. This code can establish a clock setup, a desired boot sequence, assign external peripherals, configure internal peripherals, embed software that is to execute on the microcontroller or microprocessor, and prepare other software or hardware configuration settings. To generate such code, a user would have to be trained on the specific code or hardware nuances of the microcontroller or microprocessor, which can vary from one architecture to another. Some architectures include a graphical tool that enables the user to visualize the configuration settings.

BRIEF SUMMARY

Existing content generation tools are often rigid and do not provide the user with a great deal of flexibility in generating the content. Existing content tools also are often associated with a specific device, and a different content generation tool may be required for each device. It is with respect to these and other considerations that the embodiments described herein have been made.

Embodiments described herein utilize a graphical user interface to enable a user to select and configure a programmable computing device such that content (e.g., code, settings, parameters, option bits or bytes, EEPROM data, etc.) is generated for the programmable computing device. Embodiments described herein facilitate configurable content being generated for a programmable computing device based on a user's selections without the user having to specifically write the content. In some embodiments, a user may select the code generation strategy to be employed.

In an embodiment, a method, comprises presenting, via a graphical user interface to a user, a list of components for a project associated with a programmable computing device; receiving, via the graphical user interface, a first selection of a user-selected component for the project from the list of components. In response to the user-selected component being configurable, the method includes: presenting, via the graphical user interface, user-selectable component configuration options for the user-selected component; receiving, via the graphical user interface, component configuration option selections for the user-selected component; presenting, via the graphical user interface, user-selectable code generation strategy options for the user-selected component; receiving, via the graphical user interface, code generation strategy option selections for the user-selected component; generating settings for the user-selected component based on the received component configuration option selections and the received code generation strategy option selections for the user-selected component; and generating or updating a configuration store based on the settings for the user-selected component. Content for the programmable computing device is generated based on the user-selected component and the configuration store, the generating content including generating, updating, or retrieving a code generation strategy parameters file and generating code associated with the user-selected component based on the code generation strategy parameters file.

In an embodiment, a non-transitory computer-readable medium's contents configure a processing device to perform a method. The method comprises presenting, via a graphical user interface to a user, a list of components for a project associated with a programmable computing device; receiving, via the graphical user interface, a first selection of a user-selected component for the project from the list of components. In response to the user-selected component being configurable, the method includes: presenting, via the graphical user interface, user-selectable component configuration options for the user-selected component; receiving, via the graphical user interface, component configuration option selections for the user-selected component; presenting, via the graphical user interface, user-selectable code generation strategy options for the user-selected component; receiving, via the graphical user interface, code generation strategy option selections for the user-selected component; generating settings for the user-selected component based on the received component configuration option selections and the received code generation strategy option selections for the user-selected component; and generating or updating a configuration store based on the settings for the user-selected component. Content for the programmable computing device is generated based on the user-selected component and the configuration store, the generating content including generating, updating, or retrieving a code generation strategy parameters file and generating code associated with the user-selected component based on the code generation strategy parameters file.

In an embodiment, a computing device comprises a display device, a memory, and at least one processor. The memory, in operation, stores computer instructions. The at least one processor, in operation, executes the computer instructions to: present, via the display device and to a user, a list of components for a project associated with a programmable computing device; receive a first selection of a user-selected component for the project from the list of components. In response to the user-selected component being configurable, the at least one processor executes the computer instructions to display, via the display device, user-selectable component configuration options for the user-selected component; receive component configuration option selections for the user-selected component; display user-selectable code generation strategy options for the user-selected component; receive code generation strategy option selections for the user-selected component; generate settings for the user-selected component based on the received component configuration option selections and the received code generation strategy option selections for the user-selected component; and generate or update a configuration store based on the settings for the user-selected component; and generate content for the programmable computing device based on the user-selected component and the configuration store, the generating content including generating, updating or retrieving a code generation strategy parameters file and generating code associated with the user-selected component based on the code generation strategy parameters file.

In an embodiment, a system comprises a programmable computing device, and a non-transitory computer-readable medium having contents, which, in operation, cause a processor to: present, via a graphical user interface to a user, a list of components for a project associated with the programmable computing device; receive, via the graphical user interface, a first selection of a user-selected component for the project from the list of components; in response to the user-selected component being configurable: display, via the graphical user interface, user-selectable component configuration options for the user-selected component; receive, via the graphical user interface, component configuration option selections for the user-selected component; display, via the graphical user interface, user-selectable code generation strategy options for the user-selected component; receive, via the graphical user interface, code generation strategy option selections for the user-selected component; generate settings for the user-selected component based on the received component configuration option selections and the received code generation strategy option selections for the user-selected component; and generate or update a configuration store based on the settings for the user-selected component; generate content for the programmable computing device based on the user-selected component and the configuration store, the generating content including generating, updating or retrieving a code generation strategy parameters file and generating code associated with the user-selected component based on the code generation strategy parameters file; and provide the content to the programmable computing device.

In an embodiment, a method comprises presenting, via a graphical user interface to a user, a list of versatile components for a project associated with a programmable computing device, and receiving, via the graphical user interface, a selection of a user-selected versatile component for the project from the list of versatile components. User-selectable versatile component configuration options for the user-selected versatile component are presented via the graphical user interface, and versatile component configuration option selections for the user-selected versatile component are received via the graphical user interface. Settings for a first instance of the user-selected versatile component are generated based on the received versatile component configuration option selections, and a configuration store is generated or updated based on the generated settings for the first instance of the user-selected versatile component. Content for the programmable computing device is generated based on the configuration store. At least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections.

In an embodiment, a non-transitory computer-readable medium' contents configure a processing device to perform a method. The method comprises presenting, via a graphical user interface to a user, a list of versatile components for a project associated with a programmable computing device, and receiving, via the graphical user interface, a selection of a user-selected versatile component for the project from the list of versatile components. User-selectable versatile component configuration options for the user-selected versatile component are presented via the graphical user interface, and versatile component configuration option selections for the user-selected versatile component are received via the graphical user interface. Settings for a first instance of the user-selected versatile component are generated based on the received versatile component configuration option selections, and a configuration store is generated or updated based on the generated settings for the first instance of the user-selected versatile component. Content for the programmable computing device is generated based on the configuration store. At least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections.

In an embodiment, a computing device comprises a display device, a memory, which, in operation, stores computer instructions, and at least one processor. The at least one processor, in operation, executes the computer instructions to: present, via a graphical user interface to a user, a list of versatile components for a project associated with a programmable computing device; receive, via the graphical user interface, a first selection of a user-selected versatile component for the project from the list of versatile components; present, via the graphical user interface, user-selectable versatile component configuration options for the user-selected versatile component; receive, via the graphical user interface, versatile component configuration option selections for the user-selected versatile component; generate settings for a first instance of the user-selected versatile component based on the received versatile component configuration option selections; generate or update a configuration store based on the settings for the first instance of the user-selected versatile component; and generate content for the programmable computing device based on the configuration store. At least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections.

In an embodiment, a system comprises a programmable computing device, and a non-transitory computer-readable medium having contents, which, in operation, cause a processor to: present, via a graphical user interface to a user, a list of versatile components for a project associated with the programmable computing device; receive, via the graphical user interface, a first selection of a user-selected versatile component for the project from the list of versatile components; present, via the graphical user interface, user-selectable component configuration options for the user-selected versatile component; receive, via the graphical user interface, component configuration option selections for the user-selected versatile component; generate settings for a first instance of the user-selected versatile component based on the received component configuration option selections; generate or update a configuration store based on the settings for the first instance of the user-selected versatile component; and generate content for the programmable computing device based on the configuration store. At least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views, unless the context indicates otherwise. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 5 is an illustrative example of a component parameters file in accordance with some embodiments described herein.

FIG. 6 is an illustrative example of a component parameters file that obtains values from the parameters file of FIG. 5 in accordance with some embodiments described herein.

FIG. 12 is an illustrative example of a hook that may be employed by a generation service in accordance with some embodiments disclosed herein.

FIG. 14 illustrates an example of code of a strategy descriptor file that may be employed to generate a code generation parameters file to be provided to a code generation service in accordance with some embodiments described herein.

FIG. 15 illustrates an example of a code generation parameters file that may be generated in response to the invocation of a strategy descriptor file by a code generation service in accordance with some embodiments disclosed herein.

FIG. 17 illustrates an example of a code generation parameters file that may be generated in response to the invocation of a strategy descriptor file by a code generation service in accordance with some embodiments disclosed herein.

FIG. 18 illustrates an example structure of an output code generated by a code generation service using a code generation parameters file in accordance with some embodiments disclosed herein.

DETAILED DESCRIPTION

In the following description, along with the accompanying drawings, certain details are set forth in order to provide a thorough understanding of various embodiments of devices, systems, methods, and articles. One of skill in the art, however, will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, magnetic field sensors, memories, bus systems, etc., have not been shown or described in detail in some figures to avoid unnecessarily obscuring descriptions of the embodiments. Moreover, well-known structures or components that are associated with the environment of the present disclosure, including but not limited to the communication systems and networks, have not been shown or described in order to avoid unnecessarily obscuring descriptions of the embodiments.

Unless the context indicates otherwise, throughout the specification and claims that follow, the word "comprise" and variations thereof, such as "comprising," and "comprises," are to be construed in an open, inclusive sense, that is, as "including, but not limited to."

Throughout the specification, claims, and drawings, the following terms take the meaning explicitly associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof, refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context indicates otherwise. In addition, throughout the specification, the meaning of "a," "an," and "the" include singular and plural references. Furthermore, the particular features, structures, or characteristics may be combined in any suitable manner in one or more embodiments to obtain further embodiments.

Figure 1:
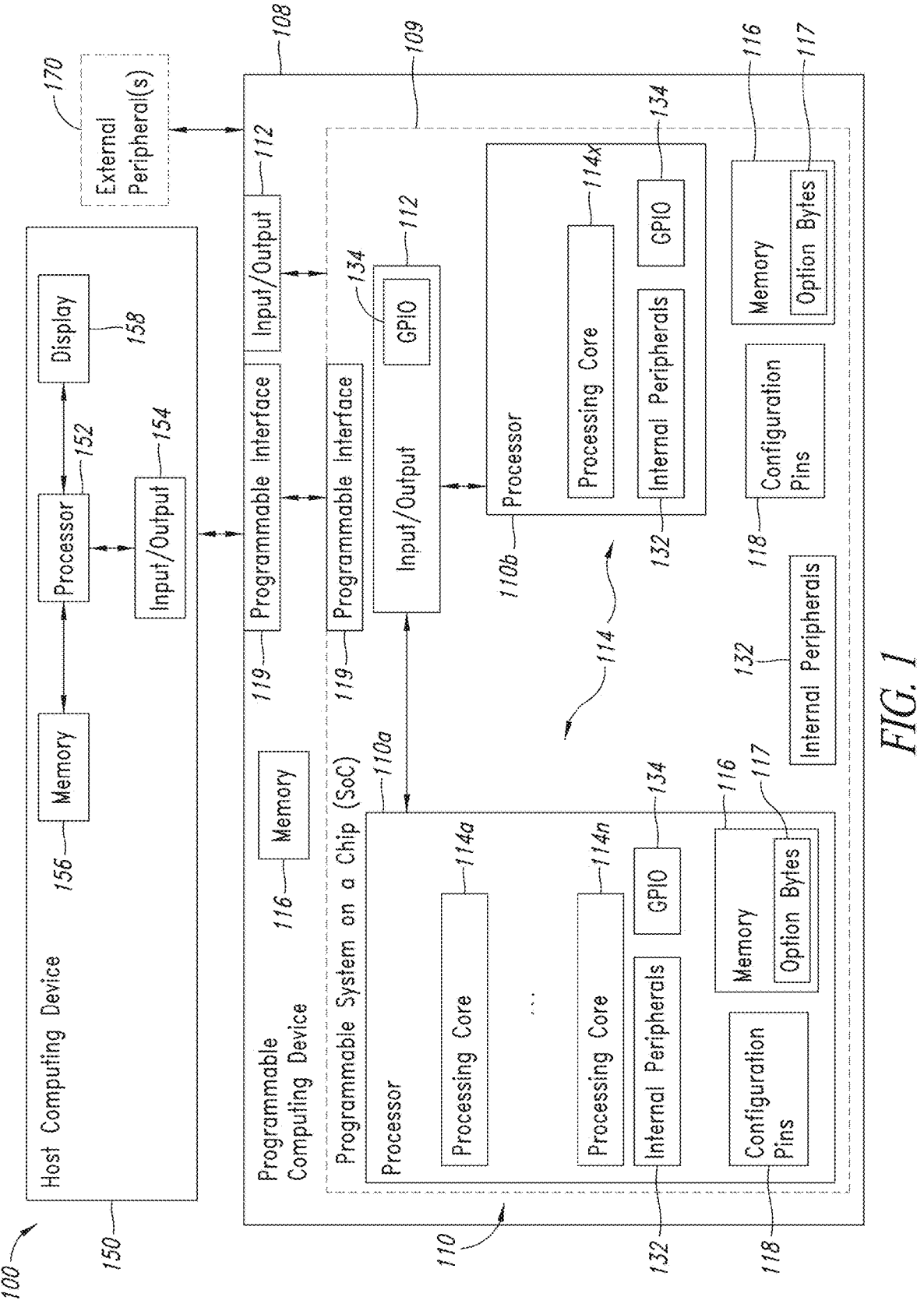
FIG. 1 is a block diagram showing an example computing environment for implementing some embodiments described herein.

FIG. 1 is a block diagram showing an example computing environment 100 for implementing embodiments described herein. Environment 100 includes a programmable computing device 108 and a host computing device 150.

The programmable computing device 108 has one or more processors 110, input/output peripherals 112 and a programmable interface 119. As illustrated, the programmable computing device comprises one or more systems on a chip (SoC) 109, each of which may include one or more processors 110, one or more input/output peripherals 112, and a programmable interface 119, which may couple to the input/output peripherals 112 and the programmable interface 119 of the programmable computing device 108.

The processors 110 may have one or more processing cores 114, one or more memories 116, and associated configuration pins, jumpers, or switches 118. The associated configuration pins, jumpers, or switches 118 may typically be at the level of the SoC 109 instead of at the processor level. In FIG. 1, processor 110a includes processing cores 114a to 114n, and processor 110b includes processing core 114x. The computing device 108 may include other internal peripherals 132, such as graphics processing units, wireless network modules, analog-to-digital converters, microelectromechanical systems, sensors, etc., and other general purpose input/output (GPIO) interfaces 134. The internal peripherals 132 and GPIOs 134 may be at various levels, such as a processor 110 level, a SoC 109 level, a programmable computing device level 108, a processing core 114 level (e.g., configurable components of the processing core 114, not shown in FIG. 1 for ease of illustration), or combinations thereof.

The programmable computing device 108 may be a microprocessor, microcontroller, system board or other computer device that is or contains one or more integrated circuits having a programmable interface 119. In some embodiments, the programmable computing device 108 may comprise a plurality of SoCs (see SoC 109) each having a programmable interface 119, and the programmable computing device 108 may comprise a common programmable interface 119, which, in operation, may couple to the programmable interfaces 119 of each of the plurality of SoCs.

In some embodiments, the processors 110 may include a state machine, a microprocessor, a programmable logic circuit, discrete circuitry, logic gates, registers, etc., and various combinations thereof. In operation, the processors 110 may control booting of the programmable computing device 108, overall operation of the programmable computing device 108, execution of applications programs by the programmable computing device 108, communications between internal peripherals 132 and external devices, such as the illustrated external peripherals 170, etc.

The programmable computing device 108 also includes one or more memories 116 such as one or more volatile or non-volatile memories, such as flash memories, or a combination thereof, which may store, for example, all or part of instructions and data related to applications and operations performed by the programmable computing device 108. For example, one or more of the memories 116 may store computer instructions that when executed by the processor 110, boot the programmable computing device 108 or cause the programmable computing device 108 to perform a desired function. The memories 116 may also store information that is used to configure the hardware of the programmable computing device 108. For example, the option bytes 117 shown in FIG. 1, may store information that is used to configure the hardware of the programmable computing device 108. The memories 116 may be included at various levels, such as the programmable computing device 108 or board level, or board level, at the SoC 109 level, at a processor level 110, at a processing core 114 level, etc., and various combinations thereof.

As mentioned above, the programmable computing device 108 also includes one or more internal peripherals 132, such as a universal asynchronous receiver-transmitter (UART), a timer, an analog-to-digital (A/D) converter, a digital to analog (D/A) converter, an inter integrated circuit (IC2) interface, a serial peripheral (SPI) interface, etc. As illustrated, processor 110a includes one or more internal peripherals 132 separate from processing cores 114a-114n, processor 110b includes one or more internal peripherals 132 separate from processing core 114x, and SoC 109 includes one or more internal peripherals 132 separate from processors 110a, 110b. Internal peripherals 132 may also be included at the programmable computing device 108 or board level, and processing cores may have configurable components as well.

The input/output peripherals 112 may include one or more general purpose input/output (GPIO) interfaces 134, dedicated input or output interfaces (e.g., serial input/output ports), wireless interfaces, etc. In some embodiments, the input/output peripherals 112 may be configured to receive input data from other computing devices or may be configured to provide output data to other computing devices, such as the external peripherals 170. For example, a GPIO 134 may be configured to receive data from an external computing device and provide the data to an internal peripheral 132, to receive data from an internal peripheral 132 and provide the data to an external computing device, or combinations thereof. As illustrated, processing core 114a includes one or more GPIO interfaces 134, processor 110a includes one or more GPIO interfaces 134 separate from processing cores 114a-114n, processor 110b includes one or more GPIO interfaces 134 separate from processing core 114x, and programmable device 108 includes one or more GPIO interfaces 134 separate from processors 110a, 110b. GPIO interfaces 134 may be included at various levels, such as the programmable device 108 level, the SoC 119 level, etc., and various combinations thereof.

The programmable computing device 108 may also include one or more bus systems (not illustrated) at various levels, which may be configured such that the SoCs 109, processors 110, input/output peripherals 112 (e.g., at the boundary between a board and an SoC), processing cores 114, memories 116, configuration pins 118 (e.g., at the boundary between a board and an SoC), internal peripherals 132, GPIOs 134, or other circuits or circuitry (not illustrated) may be communicatively coupled to one another to send or receive, or send and receive, data to or from other components. The bus system may include one or more of data, address, power, or control busses, or some combination thereof, electrically coupled to the various components of the programmable computing device 108.

The host computing device 150 includes a processor 152, an input/output interface 154, a memory 156 and a display 158. The host computing device 150 is configured to employ embodiments described herein to generate a graphical user interface to present to a user, to enable the user to select and configure components, and to generate content from those components for programming and configuring the software or hardware, or both, of the programmable computing device 108. Processor 152 may include one or more processing cores that are configured to execute computer instructions to employ embodiments described herein. While the host computing device 150 may be implemented as a standalone system, embodiments are not so limited. For example, distributed embodiments may be employed (e.g., an application executing on a local host computing device may communicate with a remote server, which may provide all or part of the functionality of the host computing device 150).

Memory 156 may include one or more various types of non-volatile and/or volatile storage technologies. Examples of memory 156 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 156 may be utilized to store information, including computer-readable instructions that are utilized by processor 152 to perform actions, including embodiments described herein. Memory 152 may also store other information, which is discussed in more detail below in conjunction with FIG. 2.

Input/output interface 154 may include one or more other data input or output interfaces. For example, the input/output interface 154 may include or provide data to a display device 158, which can be used to present the graphical user interface to the user. The input/output interface 154 can accept input from the user to select and configure or customize components, as described herein. Moreover, the input/output interface 154 is configured to provide content generated as described herein to the programmable computing device 108.

Embodiments of the system 100 of FIG. 1 may include fewer components than illustrated, may include more components than illustrated, and may combine or separate components in various manners. For example, the programmable interface 119 of the programmable computing device 108 may be part of the input/output peripherals 112, multiple programmable interfaces may be employed (e.g., for different SoCs 109, processors 110, or processing cores 114), the processing cores 114a to 114n of processor 110a may have separate memories 116 and configuration pins 118, shared memories 116 and configuration pins 118, input peripherals 132, input/output peripherals 112, and GPIO interfaces 134 may be combined or split in various embodiments, or various combinations thereof. In another example, the display 158 may be part of the input/output interface 154 in some embodiments (e.g., a touchscreen may be employed display options and to receive user input).

Figure 2:
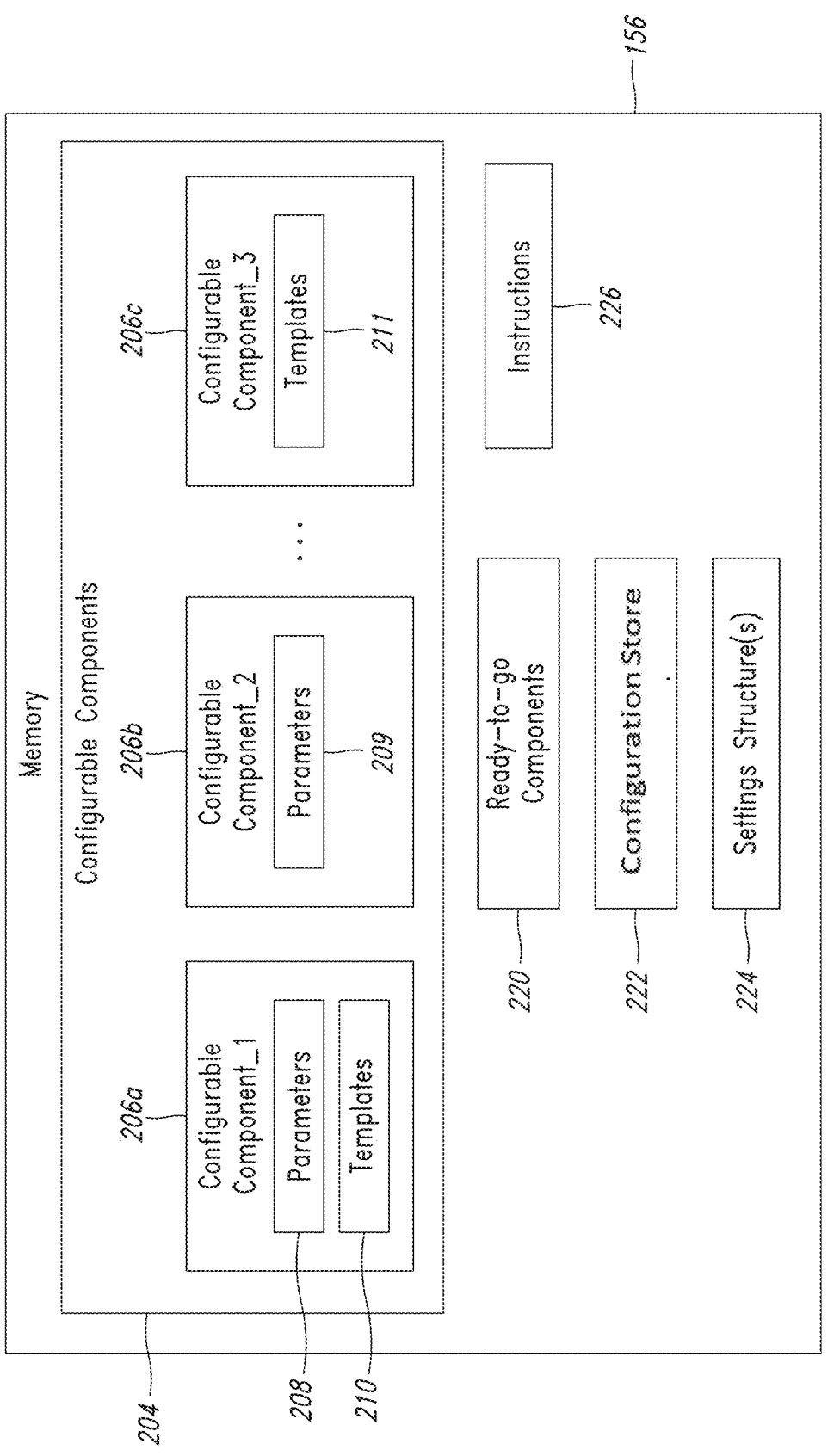
FIG. 2 is a block diagram showing an example conceptual structure for storing aspects utilized in generating content in accordance with some embodiments described herein.

FIG. 2 is a block diagram showing an example conceptual structure of a memory 156 for storing aspects utilized in generating content in accordance with embodiments described herein. The memory 156 may be the memory 156 of the host computing device 150 from FIG. 1.

The memory 156 may store configurable components 204, ready-to-go components 220, a configuration store (e.g., a global map or settings registry) 222, and settings structures for each configurable component 224. In some embodiments, the configuration store 222 and the settings files may be combined. Memory 156 may also store computer instructions 226 that are executable by a processor (e.g., processor 152 in FIG. 1) to perform embodiments described herein. The data stored in the memory 156 may utilize standard syntax, e.g., JSON schema, which can enable the use of standard libraries using or taking benefit from that syntax, e.g., JSON forms.

Configurable components 204 include at least one configurable component 206a-206c. The configurable components 206a-206c include or describe some configuration, control, implementation, or functionality associated with software or hardware aspects of a programmable computing device, such as programmable computing device 108 in FIG. 1. These configurable components 206a-206c have one or more parameters (e.g., constraints or variables) that can be selected, or set by the user.

Configurable components 206a-206c may include parameters files, template files, or both. For example, configurable component 206a includes parameters 208 and templates 210, configurable component 206b includes parameters 209 but no templates, and configurable component 206c includes templates 211 but no parameters.

Parameters 208 and 209 may include one or more files that store parameters of the configurable component that can be selected or set by the user. The parameters 208 and 209 may store the possible values the user can select for one or more parameters. These values can be direct values, advanced expressions, queries to the configuration store, or queries to other parameters (e.g., other parameters 208, 209) or to databases (not illustrated). The parameters 208 and 209 may be used to configure or implement one or more software or hardware aspects associated with the programmable computing device. In various embodiments, one or more generic or customized grammar structures may be utilized to write or generate the parameters 208 and 209. This grammar is a set of rules indicating how to express the configurability of a component or template.

In various embodiments, one or more parameters of the parameters 208 and 209 may be at least partially defined or limited by another parameter, component, or template. Accordingly, one or more parameters can be dependent on one or more other parameters, components, or templates, which can create various dependencies among parameters.

Templates 210 and 211 may include one or more files that store previously generated templates. The templates 210 and 211 are configuration tools for the programmable computing device. The templates 210 and 211 may be files that contain instrumented content that is used to generate content to initialize, configure, or control a software or hardware aspect of the programmable computing device 108. In some embodiments, the templates 210 and 211 contain C code instrumented with handlebars templating language. At a content generation stage, the instrumented parts may be replaced by information coming from the configuration store 222, which is described in more detail below.

In some embodiments, one or more of the templates 210 and 211 may rely directly or indirectly on parameters selected by the user, for example, through the configuration store 222. For example, configurable component 206a may include a single template 210, which uses global registry values corresponding to four user-selectable parameters, which are defined in the parameters 208. In some embodiments, the templates may be selected or linked to one another by the user, or a user might choose whether a particular template is used during the content generating process, including choosing between mutually exclusive templates. In at least one embodiment, one or more templates 210 and 211 may rely or obtain values from other templates, other components, or other software or hardware projects that are to be implemented on the programmable computing device.

The ready-to-go components 220 are previously designed components that configure or pilot one or more software or hardware aspects of the programmable computing device. In at least one embodiment, the ready-to-go components 220 may also be referred to as non-configurable components. In various embodiments, the ready-to-go components 220 do not include any user-selectable features. Rather, the ready-to-go components 220 are fully operational and can configure or implement one or more software or hardware aspects of the programmable computing device without further input or selections by the user. For example, a ready-to-go component can be provided in C code, and can be a driver (e.g., HAL CRC) or any other piece of software. Ready-to-go components may be useable in standalone mode. As discussed in more detail below, the user may be presented with a graphical user interface in which the user can select to add or remove ready-to-go components from the project.

The settings for a configurable component 224 are optional and store the results of the configuration choices for each of the user-selected configurable components, parameters, and templates. For example, the specific settings for a configurable component 224 may identify one or more templates from the templates 210 that were selected by the user. The settings for a configurable component 224 may also contain the values associated to the parameters 208 that were selected by the user. In some embodiments, the settings for a configurable component 224 may also store optional user settings for software or hardware aspects of the programmable computing device. In some embodiments, the settings for a configurable component 224 may be employed for debugging purposes.

In some embodiments, a single settings structure 224 is generated for each selected configurable component 204. In other embodiments, multiple settings structures 224 are generated for a single selected configurable component 204. In yet other embodiments, a single settings structure 224 may be generated for multiple selected configuration components 204. Moreover, multiple settings structures 224 can be generated for multiple selected configuration components 204. In some embodiments, these settings structures 224 may be stored as JSON files.

The configuration store 222 is an in-memory object centralizing all the user selections and settings that are generated via the user's selection of configurable components 204, parameters, and templates. The configuration store in-memory object also may be stored and synchronized with a file to facilitate its persistence. By extension, the configuration store 222 also may refer to a software component providing a dictionary, getters/setters, or services to compute or re-compute content for a programmable computing device based on expressions or dependencies. Overall, the configuration store 222 is a dictionary or database memorizing software components settings and hardware platform settings of the programmable computing device. In some embodiments, separate global maps or settings registries may be generated for various software and hardware aspects of the programmable computing device.

As described herein, the configuration store 222 is a software component implementing a set of services to retrieve, store, compute, re-compute, or resolve values selected by the user. In various embodiments, the configuration store 222 may comprise a JSON object with a set of accessors (API) to the components, templates, and parameter values selected by the user. In some embodiments, the configuration store 222 may be a concatenation of all the settings for each configurable component 224. In other embodiments, the configuration store 222 may be updated directly from the user's selections without using or accessing the settings for each configurable component 224. In some embodiments, the configuration store 222 includes or is associated with services in addition to the JSON objects.

As discussed in more detail below, the host computing device, such as host computing device 150 in FIG. 1, utilizes the configuration store 222, along with the selected configurable components 204 and any selected ready-to-go components 220, to generate content that is provided to and used by the programmable computing device to implement, control, or configure one or more software aspects of the programmable computing device, one or more hardware aspects of the programmable computing device, or both.

The operation of one or more embodiments will now be described with respect to FIGS. 3 and 4, and for convenience will be described with respect to the embodiments of FIGS. 1 and 2 described above. In at least one of various embodiments, processes 300 and 400 described in conjunction with FIGS. 3 and 4, respectively, may be implemented by or executed on one or more computing devices, such as host computing device 150 in FIG. 1 executing instructions, such as instructions 226 (see FIG. 2) stored in the memory 156.

Figure 3:
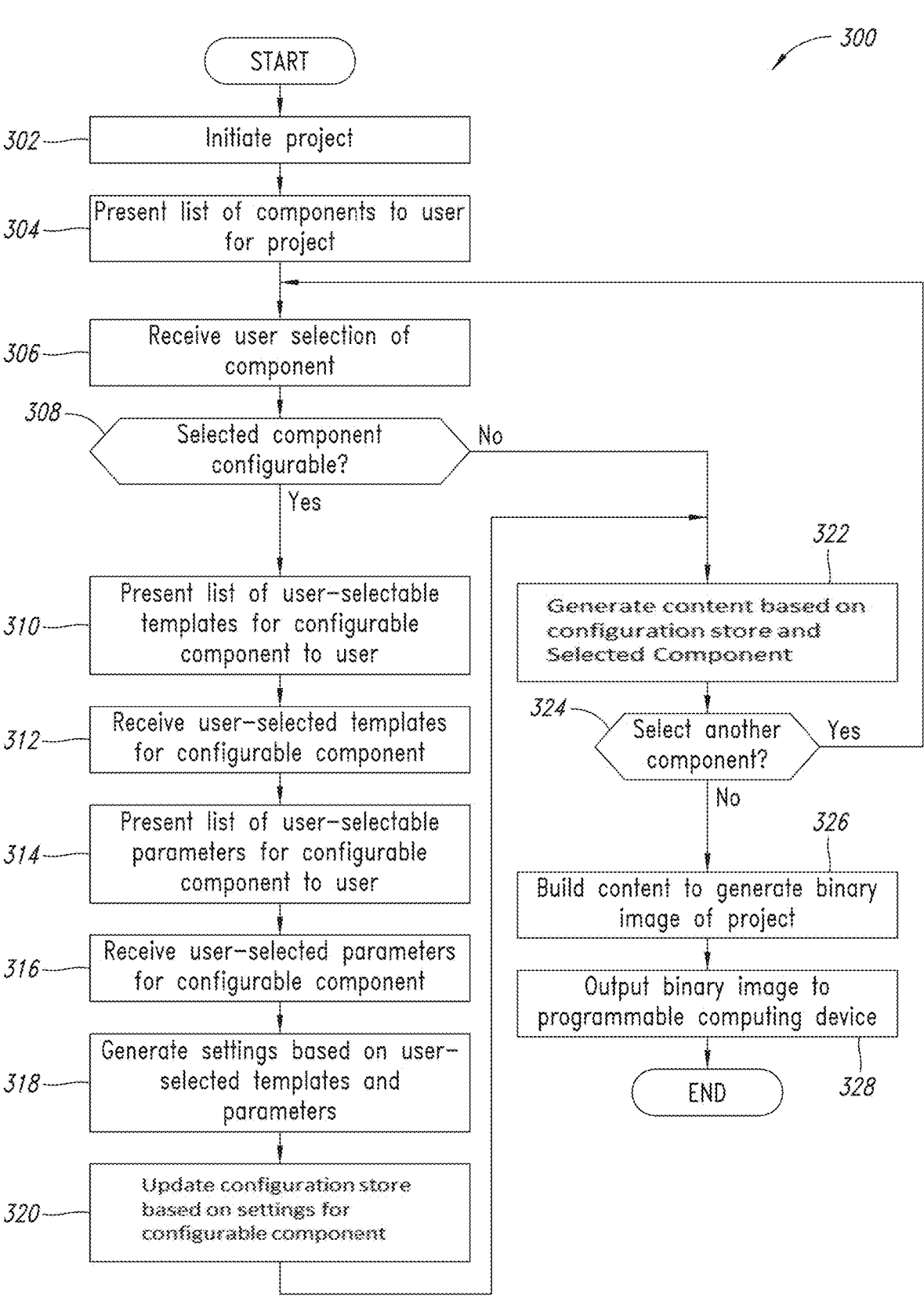
FIG. 3 shows a logical flow diagram of a process for generating content in accordance with some embodiments described herein.

FIG. 3 shows a logical flow diagram of a process 300 for generating content in accordance with embodiments described herein. Process 300 begins, after a start block, at block 302, where a project is initiated for generating content to implement on or configure a programmable computing device, such as programmable computing device 108 in FIG.

1. In some embodiments, the project initiation includes presenting a graphical user interface to a user. The graphical user interface requests or includes an input interface for the user to select a particular programmable computing device. A configuration store for the project is also initiated. The configuration store may include a defined structure, which may be predefined, or initial settings for the particular programmable computing device.

In some embodiments, a single project for software and hardware is initiated for the programmable computing device. As such, a single configuration store may be generated. In some embodiments, a first project may be initiated for software of the programmable computing device and a second project may be initiated for hardware of the programmable computing device. Separate global maps or settings registries may then be generated for the separate projects, and those registries may have dependencies on each other. In at least one such embodiment, process 300 may be executed sequentially or in parallel for the separate software and hardware projects. In some embodiments, process 300 may be executed for concurrent processing of both the software and hardware projects.

Process 300 proceeds to block 304, where a list of a plurality of components for the project are presented to the user in the graphical user interface. In at least one embodiment, the list of components may be generated for the user based on the particular programmable computing device selected for the project. These components may be those components that are designed for or compatible with the programmable computing device. In some embodiments, the list of components may be selected for presentation based on the execution context specificities of the programmable computing device. In some architectures, an execution context for a particular processing core or a particular mode of operation (e.g., TrustZone mode) may be selected by the user. The list of components presented to the user can be dependent on these user selections. The list of components may include configurable components, such as configurable components 204 in FIG. 2; or non-configurable components, such as ready-to-go components 220 in FIG. 2; or some combination thereof.

Process 300 continues at block 306, where a user selection of a component is received. In at least one embodiment, a user may select a component from the list via the graphical user interface. Although process 300 discusses a user's selection of a single component at a time, embodiments are not so limited. In some embodiments, a plurality of components may be selected by a user.

Process 300 proceeds next to decision block 308, where a determination is made whether the selected component is a configurable component or a non-configurable component. In some embodiments, the components may have a tag or other identifier indicating whether the component is configurable by the user or not. In other embodiments, a database or other data structure of configurable and non-configurable components may be maintained and compared against the selected component. If the selected component is configurable, then process 300 flows from block 308 to block 310; otherwise, process 300 flows from block 308 to block 322.

As mentioned above, a plurality of components may be selected by a user; if so, process 300 flows from block 308 to block 310 for any selected configurable components and from block 308 to block 322 for any selected non-configurable components. In various embodiments, the user may be enabled to configure each selected component individually or in parallel via the graphical user interface.

At block 310, a list of one or more user-selectable templates for the user-selected configurable component is presented to the user via the graphical user interface. In some embodiments, the list of user-selectable templates may include one or more characteristics of the template that may be set or selected by the user, such as if the template links to another template, component, or project.

The list of user-selectable templates can be customized or defined to utilize user-desired user interface elements. Accordingly, the user interface can be customized for the different user-selectable templates such that the user can select, define, or set one or more characteristics of the templates. In some embodiments, this customization can allow the templates to use data from databases instead of listing all possible values. In some embodiments, this customization can specify the user-selectable aspects of the templates. In some embodiments, a user may select between mutually-exclusive templates, with only one of the templates being selected to use in the content generation process for the user-selected configurable component.

In various embodiments, block 310 may be optional and may not be performed. For example, in some embodiments, a template may be applied by default without a user's selection. In some embodiments, a template may not be employed in the configuration of a configurable component.

Process 300 proceeds from block 310 to block 312, where user-selected templates are received for the configurable component. In some embodiments, the user-selected template may include other information provided by the user defining how the template is to be used.

In some embodiments, one or more configurable components may include user-selectable parameters, but not include user-selectable templates. In such an embodiment, blocks 310 and 312 may not be performed for those selected configurable components that do not include user-selectable templates.

Process 300 continues from block 312 to block 314, where a list of one or more user-selectable parameters for the user-selected configurable component is presented to the user via the graphical user interface. In some embodiments, the list of user-selectable parameters may include a list of the parameters and the possible values for those parameters. In other embodiments, the list may identify the parameters and include an interface to receive a user-defined value. In other embodiments, the list may identify the parameters and include an interface to receive a user-defined value limited to some boundaries. In some embodiments, the list of user-selectable parameters may include a list of the parameters and the possible values for some of those parameters, and include an interface to receive a user-defined value for other parameters, with or without boundaries.

The list of user-selectable parameters can be customized or defined to utilize user-desired user interface elements. Accordingly, the user interface can be customized for the different user-selectable parameters such that the user can select, define, or set one or more parameters. In some embodiments, this customization can allow the parameter selections to be driven by data from databases, expressions, formulas, or dependencies from other parameters, instead of listing all possible values. In other embodiments, this customization can specify the user-selectable aspects of the parameters. In some embodiments, this customization can specify the boundaries applicable to the user-defined values of the parameters. In various embodiments, the list of parameters may be a default list for its corresponding component.

In some embodiments, this list of user-selectable parameters may also include other information that can help the user understand the ramifications of selecting specific parameters. For example, the graphical user interface can include links to reference manuals, diagrams, tool tips, etc. that help explain the parameters and how different user selections can impact other components or parameters.

Process 300 proceeds from block 314 to block 316, where user-selected parameters are received for the configurable component. In at least one embodiment, a value of one or more parameters is received from the user. As mentioned above, the user may select the particular value from the list of possible values for the parameter via the graphical user interface. Alternatively, the user may input the specific value of the parameter, according to boundaries if they are specified. Non-acceptable values of user input may trigger user warnings or automatic adjustments (e.g., rounding down to a maximum value, etc.).

In some embodiments, the configurable component may include user-selectable templates, but not include user-selectable parameters. In such an embodiment, blocks 314 and 316 may not be performed for those selected configurable components that do not include user-selectable parameters.

Process 300 continues from block 316 to block 318, where one or more settings structures are generated for the selected configurable component based on the user-selected parameters, user-selected templates, or some combination thereof. In some embodiments, the settings structures may be a list or other data structure identifying the parameters selected by the user and the associated values selected by the user, the templates selected by the user and any customizable features of the selected templates, or other information indicating how the configurable component was customized by the user.

In various embodiments, the settings structures may be updated by overlaying the user-selected information for the user-selected component to override some values of that component. In some embodiments, a component can override a parameter from another component, such as when components rely on one another for computation. In other embodiments, a component can override a query from another component, such as by changing the choices the user can make associated with that component. Because some parameters can be set or defined by other templates or components, some parameter values may be propagated or overlaid based on the dependencies between parameters, templates, and components. For example, application-level values may override driver-level values. In this way, user selections and changes at the application level can change values or parameters at the driver level, which may then be reflected in the global map or system registry. As mentioned above, in some embodiments the settings structure 224 and the configuration store 222 may be combined. Thus, in some embodiments block 318 may be combined with the next block 320.

Process 300 proceeds from block 318 to block 320, where the configuration store 222 is updated based on the settings for each configurable component. As mentioned above, the configuration store is an in-memory object centralizing all the user selections and settings that are generated via the user's selection of configurable components 204, parameters, and templates. Accordingly, the parameters, templates, values, and other information selected by the user for the user-selected configurable component are added, updated, or otherwise included in the configuration store for the project based on the settings files. The configuration store may be arranged such that the user-selected values are literals that can be written directly in the hardware unit registers by the driver software of the programmable computing device. In various embodiments, the configuration store may also retain whatever is used to update the result of the expressions, formulas, or dependencies based on the user's selections. In this way, when a value is updated, such as changed by a user via the graphical user interface, all related values are updated accordingly in the configuration store.

Although FIG. 3 shows the configuration store being updated based on the settings structures being generated from the user's selections, embodiments are not so limited. In some embodiments, the configuration store may be updated in real time as the user selects components, parameters, or templates. Accordingly, in some embodiments, the use of settings structures may be optional. In some embodiments, an image of the user selection may be maintained in the JSON files.

After block 320, or if, at decision block 308, the selected component is not configurable, then process 300 flows to block 322. At block 322, content for the programmable computing device is generated based on the selected component and the information stored in the configuration store 222. It is noted that information stored in the global registry and related to other components may be used to generate content. For example, information related to a DMA associated with the selected component (e.g., a template associated with the DMA) may be employed to generate content associated with the selected component.

The configuration store 222 may operate as a consolidated database of values that can be used to generate the content from the user-selected templates and user-selected components. This content may be, for example, plain code (e.g., C code) that is used by the programmable computing device to initialize, configure, or control a software or hardware aspect of the programmable computing device 108. Accordingly, the generated content may be initialization code, application code, configuration code, a device tree blob (a hardware description interpreted at runtime), etc. The content may also be other settings, parameters, or other information that initializes, configures, or controls a software or hardware aspect of the programmable computing device. The content may also comprise associated documentation.

In various embodiments, overlays, handlebars, or a similar templating or replacement engine may be used to resolve dependencies or expressions (e.g., handlebars expressions) in the user-selected templates or in the configurable components by accessing the values stored in the configuration store. In other embodiments the latter accessed values are stored in one or more settings files containing the same information as the configuration store in-memory object. The result of this step may produce actual code that can be compiled by a compiler for use in the programmable computing device. In various embodiments, this code generation does not modify the source code of the selected components. Thus, the components can be reused in their original form for the same project or other projects without having to modify the components. In some embodiments, the system may also generate code not requiring compilation, but which can be interpreted by virtual machines (e.g., micro-python, JavaScript). In other embodiments, the system may generate data structures which are used during runtime to adapt the behavior of the programmable computing device.

As described herein, the graphical user interface allows the user to select components and values. In other embodiments, this can be performed without a graphical user interface, through a command line interface.

In some embodiments, the graphical user interface may also present a content preview to the user based on the currently selected parameters. In this way, the content generation can be triggered each time a parameter is set. When all components are configured, the content may be finally generated for the programmable computing device because all values are available with the desired values (overlays applied, expressions/formulas/dependencies computed).

Process 300 proceeds from block 322 to decision block 324, where a determination is made whether the user is to select another component. If another component is selected, process 300 loops from block 324 to block 306 to receive the user selection of the other component; otherwise, process 300 flows from block 324 to block 326. As mentioned above, process 300 may also be performed with the user selecting multiple components, which can then be configured by the user together or individually.

At block 326, the content generated for each user-selected component is built into a binary image for the project. This binary image is the information usable by the programmable computing device to initialize, configure, or control its hardware, software, or a combination thereof. In some embodiments, all generated content is utilized to build the binary image for the project. In other embodiments, a portion, but not all of the generated content, is utilized to build the binary image for the project. For example, in the case of interpreted languages, only specific content (e.g., generated code) may be uploaded in a specific memory region of the programmable computing device without regenerating the binary interpreting it.

It is noted that various code generation services can be invoked to generate content for user-selected components, and combinations of code generation services may be employed to generate content for a single user-selected components. For example, content may be generated by a default C code generation service, by a device tree code generation service coming from a community, by a proprietary 3rd party code generation service, by a code generation service generating Python code or any other language, etc., and various combinations thereof.

As illustrated, process 300 proceeds from block 326 to block 328, where the binary image is provided to the programmable computing device. In some embodiments, process 300 may sometimes return to block 304 from block 326, using the content generated at 326 as an intermediate input to the process. In some embodiments, process 300 may be executed multiple times to generate different content for different configurations of the programmable computing device. In this way, different configurations can be provided to separate programmable computing devices (even if a same type of programmable computing device), or different configurations can be provided to a single programmable computing device to allow a user of the programmable computing device to change between the different configurations.

After block 328, process 300 terminates or otherwise returns to a calling process to perform other actions.

Figure 4:
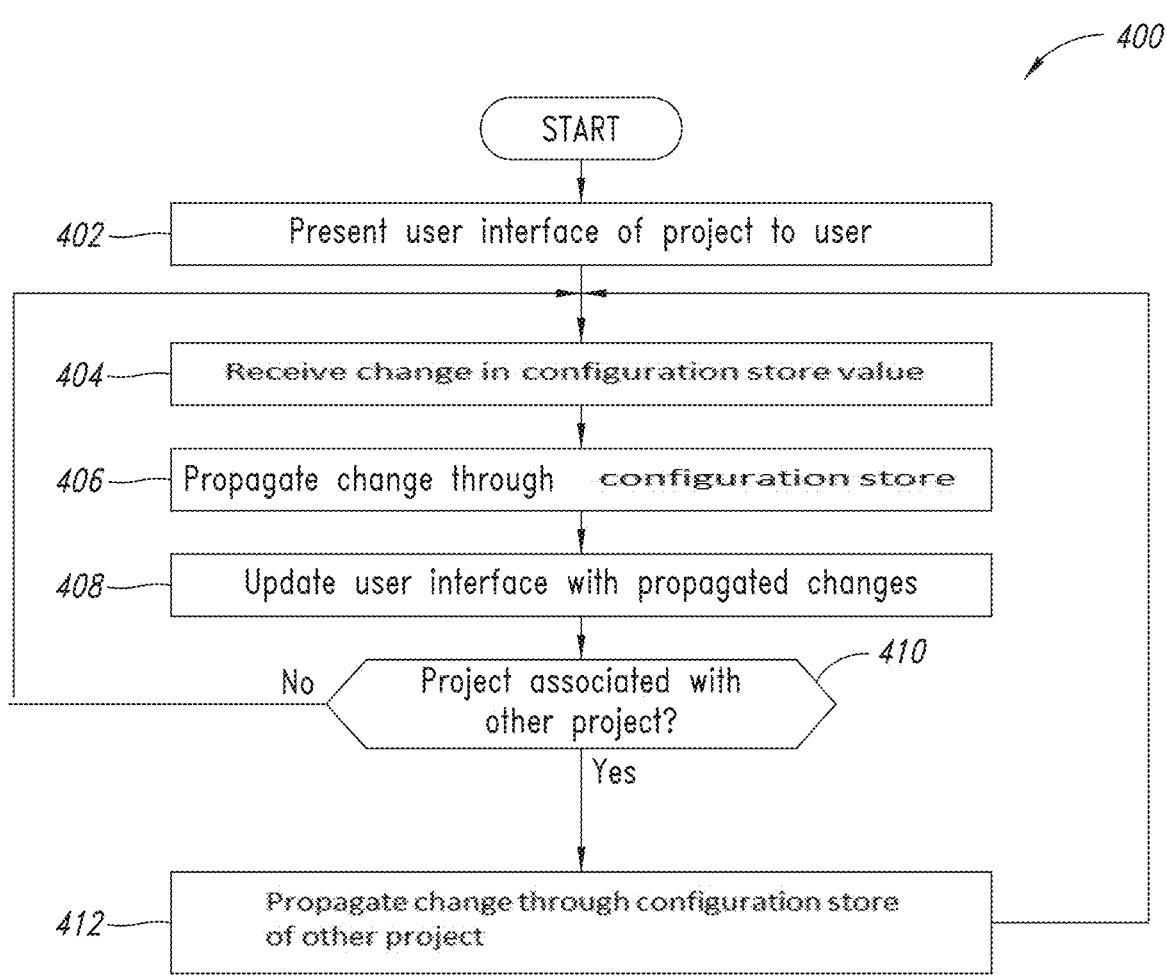
FIG. 4 shows a logical flow diagram of a process for updating a graphical user interface during the content generation process in accordance with some embodiments described herein.

FIG. 4 shows a logical flow diagram of a process 400 for updating a graphical user interface during the content generation process in accordance with embodiments described herein.

Process 400 begins, after a start block, at block 402, where a user interface of a project is presented to a user. The project may be a software project, a hardware project, or various combinations thereof. In various embodiments, this user interface is the graphical user interface displayed to the user described above with reference to FIG. 3. This user interface may display components that are selectable for use with a programmable computing device, parameters selectable by a user for a particular configurable component, templates selectable by the user for a particular configurable component, and other information. Moreover, the user interface may display the values of various parameters, settings, templates, and components, whether selected by a user, linked from one template to another, dependent on other values, or defined by a template or component, which may be predefined.

Process 400 proceeds from block 402 to block 404, where a change in a configuration store value is received. As described above, the configuration store is updated in response to a user-selected configurable component, a user-selected parameter value, a user-selected template, etc. These user-selectable conditions may indicate a change in a configuration store value.

Process 400 continues from block 404 to block 406, where the change is propagated through the configuration store. Because parameters, templates, and components can rely or depend on values of other parameters, templates, components, or projects, a change in one value can result in a change in another. Thus, the received change in the configuration store value is propagated through the configuration store in accordance with these dependencies.

Process 400 proceeds next from block 406 to block 408, where the user interface is updated based on the propagated changes in the configuration store. The user-interface also may be updated based on generated content. In some embodiments, the user interface queries the configuration store, and any changes that occurred while updating the configuration store are obtained and displayed in the user interface.

Process 400 continues next at decision block 410, where a determination is made whether the project is associated with another project. If so, process 400 flows to block 412, where the change is propagated through the configuration store of the other project. Process 400 loops to block 404 to receive another change to a configuration store value from a user.

Embodiments of the process 300 illustrated in FIG. 3 and of the process 400 illustrated in FIG. 4 may have more process blocks than illustrated, may have fewer process blocks than illustrated, and the process flow may be modified in various ways. For example, process 300 may be modified to include a block presenting configuration update information to the user based on the updated configuration store at 320 (e.g., calling the process 400).

FIG. 5 is an illustrative example of a component parameters file in accordance with embodiments described herein. In this example, the component parameters identify various different characteristics of the parameters that are selectable by a user along with the possible values. For example, the parameter "DCH1" specifies the duty cycle for a channel 1 timer that is selectable by a user. In this example, the label, such as for display to the user in the graphical user interface is "DutyCycleCH1." The type of the parameter is a number. Thus, the value selected by the user is a number. The minimum value that the user can select is zero and the maximum value the user can select is 100. Finally, the parameter indicates that the unit for this parameter is a percentage.

FIG. 6 is an illustrative example of a parameters file for an application level component that obtains or reuses parameter values from the component parameters file of FIG. 5 in accordance with embodiments described herein. The values of a timer HAL driver are overlaid with values computed from application level parameters (e.g., computing a timer period from an application frequency). In this example, the template establishes an LED dimmer whose characteristics are obtained from the parameters shown in FIG. 5. For example, the "source" of the characteristics are obtained from "Parameters from FIG. 5 .json," which is an illustrative example of depending on the parameter values in FIG. 5. The template defines the channel 1 timer as "CH1." The pulse of this timer is set as "(self.resources.pwm_led_dimmer.blocks. configs.%current_config%.fields.DCH1*%this%.Period)/ 100." As noted, this definition relies on "DCH1," which is the channel 1 timer defined in the parameters. The "this" is the current "object" or current level in the JSON object. In this particular example, "this" is the "fields" stage and "this. % Period %" refers to the Period field of the current object level.

FIGS. 5 and 6 are for illustrative purposes and should not be considered as limiting. Other information, data structures, and overlay or handlebar technology may be used to establish the content for the programmable computing device from the components, templates, and parameters selected by the user in accordance with embodiments described herein.

Figure 7:
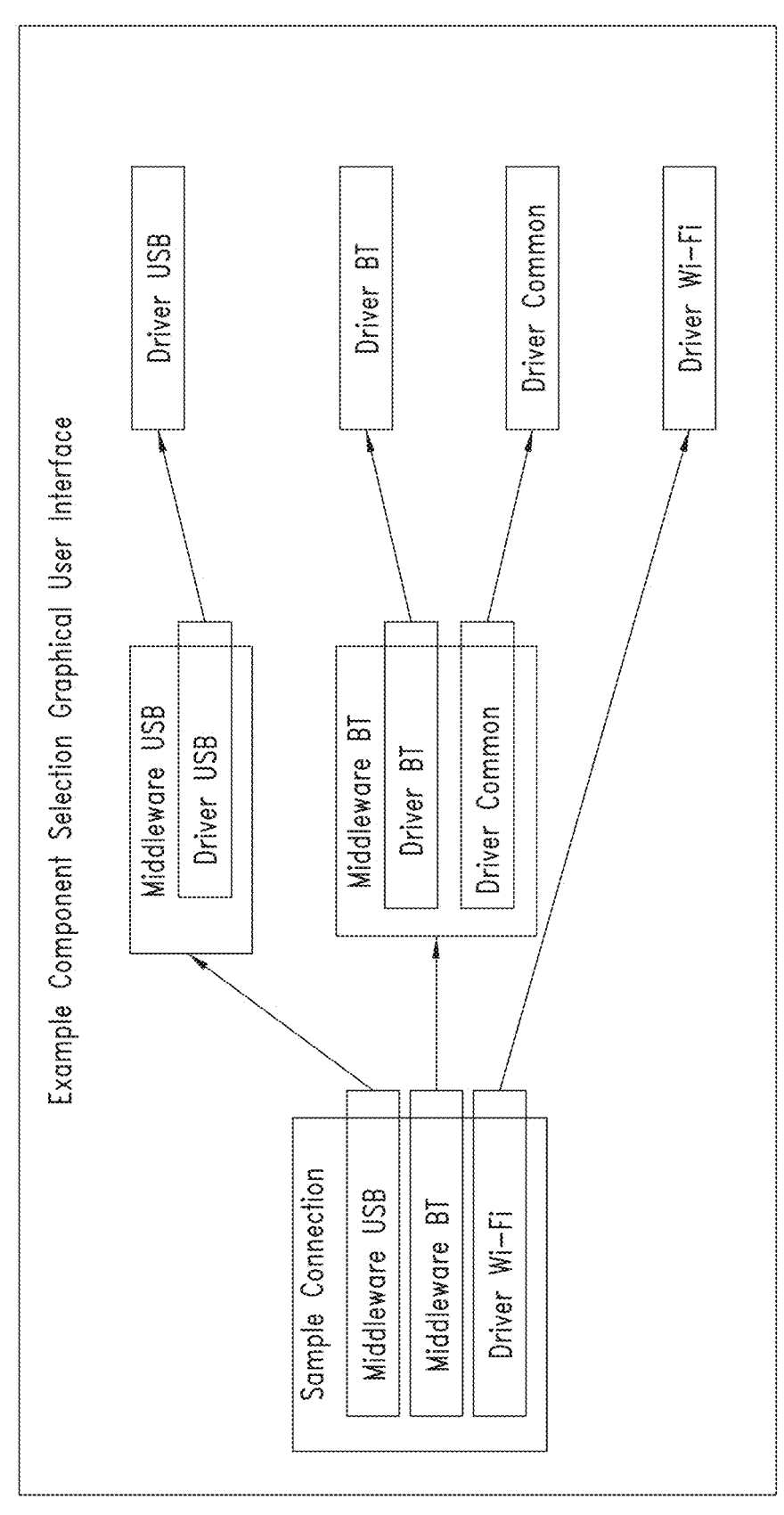
FIG. 7 is an illustrative example of a graphical user interface to enable a user to select components for a project in accordance with some embodiments described herein.

FIG. 7 is an illustrative example of a graphical user interface 700 to enable a user to select components for a project in accordance with embodiments described herein. In this illustrative example, the graphical user interface 700 may display a "Sample Connection" collection of components: "Middleware USB," "Middleware BT," and "Driver Wi-Fi." In this example, Sample connection is an applicative code component having three dependencies: two middlewares components and one driver component. For this example situation, these components are required to have a complete project. In this example, the user can select which of these components to open other components for the selection. For example, the user can select the "Middleware BT," which allows the user to then select "Driver BT" or "Driver Common." This type of user interface can enable a user to progress through various different layers of components to select the appropriate components for their project. Moreover, this graphical user interface tool can help the end-user in resolving the dependencies by proposing appropriate components or by automatically selecting the component when appropriate (e.g., when only one component is filling the criteria).

Figure 8:
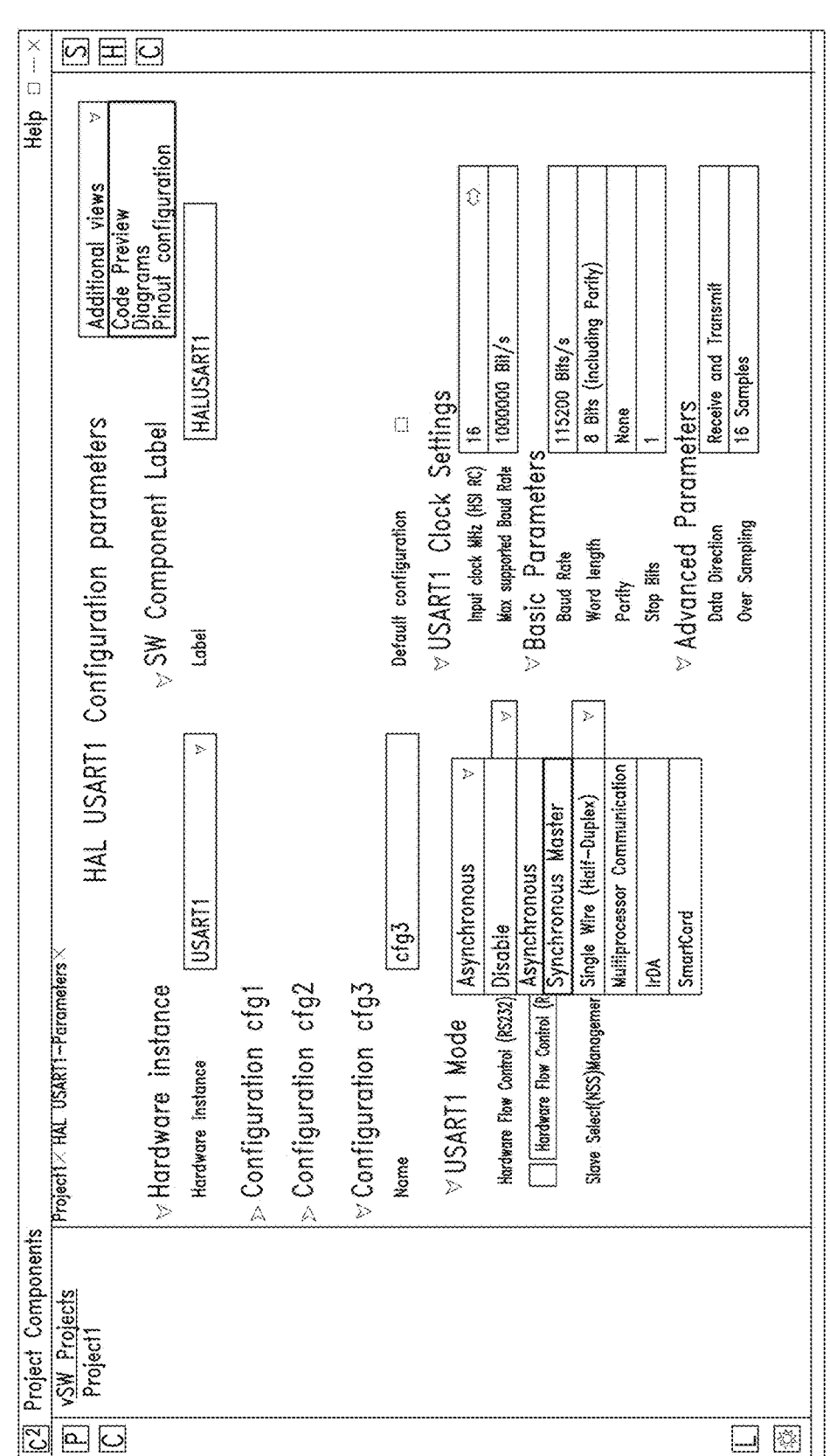
FIG. 8 is an illustrative example of a graphical user interface to enable a user to select parameters for a user-selected component in accordance with some embodiments described herein.

FIG. 8 is an illustrative example of a graphical user interface 800 to enable a user to select parameters for a user-selected component in accordance with embodiments described herein. This graphical user interface 800 can display different configurations and possible values for multiple parameters, depending on which configurable components are selected by the user.

FIGS. 7 and 8 are for illustrative purposes and should not be considered as limiting. Other information or data may be displayed to a user via the graphical user interfaces in accordance with embodiments described herein.

With reference to FIGS. 1 to 8, the method 300 may be employed to various aspects of programming a programmable computing device 108. For example, content related to the programmable computing device's 108 boot sequence may be generated, content related to the configuration of internal peripherals or components, interfaces, external components, etc., may be generated, content related to system states and transitions between states may generated, etc., and various combinations thereof. Various checks may be performed as part of the content generation process, such as software coherency checking, electrical integrity checking, etc., and various combinations thereof.

As mentioned above, the end-user may select various code generation services to be invoked to generate content for user-selected components, and combinations of code generation services may be employed to generate content for a single user-selected component. For example, content may be generated by a default C code generation service, by a device tree code generation service coming from a community, by a proprietary 3rd party code generation service, by a code generation service generating Python code or any other language, etc., and various combinations thereof.

However, the end-user has had limited control and flexibility over how the content is generated and produced. Existing mechanisms rely on a tight entanglement between the configuration tool and the component to be configured. There also is limited flexibility for the end-user to employ different approaches to the code generation process for different software components. For example, an all-in-one file approach has been imposed, or a split approach (e.g., separate files for initialization code for peripherals, with file names and locations imposed by the configuration tool).

Embodiments as described herein facilitate providing increased flexibility to the end-user to control the generation and production of the content. For example, a customization scope may be defined by an end-user (e.g., global settings, project level settings, workspace level settings, software component level settings, software level settings within a component, resource level settings (template, helper, partial), etc.), and default and custom configurations may be applied at each level. In addition, templates, helpers, folders, file names and file splits may be defined at each level to facilitate the configuration of code generation strategies at each level.

In an embodiment, one or more code generation strategy descriptors may be employed as file artefacts at various levels (e.g., at least one code generation file descriptor per software component). As discussed in more detail below, a code generation strategy descriptor describes how the code generation service or routine uses input artefacts to produce output files in a desired format. The description may be provided in various manners. For example, in various embodiments the strategy descriptor may be a JavaScript code, etc., which may include a description via text, JSON, YML, C code, etc., and various combinations thereof. Templates may be provided for an end-user to define a strategy and associate the strategy to a component (or other level). In some embodiments, a wizard/editor may be provided facilitate defining by an end-user of a custom strategy.

The strategy selected by the end-user to be applied may be configured and memorized by the system at a desired level, for example as user settings in workspace, project, or component settings. For example, code generation file descriptors may be or comprise parameters configured and stored as described above with reference to FIGS. 1-8 (e.g., using the method 300 of FIG. 3, modified to include receiving code-generation-strategy information and to include generator associated code generation file descriptors). Templates, parameters, and hooks may be employed. For example, if there are common used strategies for code generation (e.g., observed strategies), these strategies can serve as templates, to facilitate accelerating and reducing the complexity of the configuration process. For advanced end-users, personalized options may be employed. The selection and memorization process may be related to identification information associated with the code generation file descriptors (e.g., a user login ID or session ID, a workspace ID, user project preferences, etc.). In some embodiments, an end-user may specify a unique memorization process specific to the user, or partially specific to the user.

In some embodiments, a wizard/editor may be provided to facilitate defining by an end-user of a custom strategy generation and storage strategy. The wizard/editor may be configured to specify end-users who can configure the code generation file descriptors (possible at different levels), may employ or specify a Common Microcontroller Software Interface Standard (CMSIS) or other application programming interface (API), a pack-manager API, project manager API, a code generation API, etc. Templates may be employed, as mentioned above, and may propose configuration details, such as specific delimiters, specific region markers, specific generation modes (e.g., overwrite, append, etc.).

Figure 9:
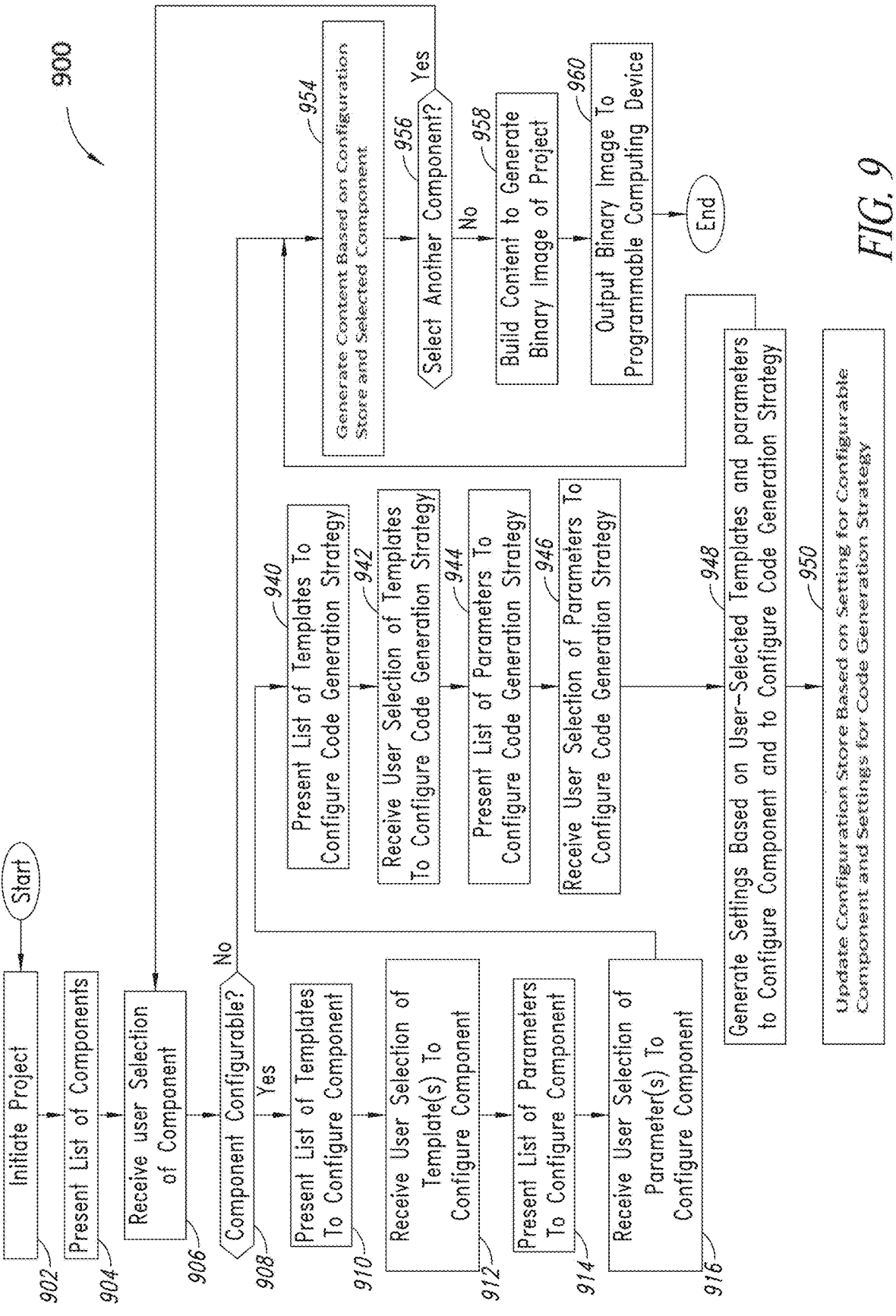
FIG. 9 is a logical flow diagram of a process for customizing the code generation process associated with generating content in accordance with some embodiments described herein.

FIG. 9 is a logical flow diagram of a process 900 for customizing the code generation process associated with generating content in accordance with embodiments described herein. Process 900 is similar in some respects to process 300, discussed above with reference to FIG. 3, and similar reference numbers designate similar blocks.

Process 900 begins, after a start block, at block 902, where a project is initiated for generating content to implement on or configure a programmable computing device, such as programmable computing device 108 in FIG. 1. Process 900 proceeds to block 904, where a list of a plurality of components for the project are presented to the user. Blocks 902 and 904 may be performed, for example, as discussed above with reference to blocks 302 and 304 of FIG. 3 (e.g., by presenting a graphical interface to a user).

Process 900 continues at block 906, where a user selection of a component is received (e.g., via the graphical interface). Process 900 proceeds next to decision block 908, where a determination is made whether the selected component is a configurable component or a non-configurable component. Blocks 906 and 908 may be performed, for example, as discussed above with reference to blocks 306 and 308 of FIG. 3. If the selected component is configurable, then process 900 flows from block 908 to block 910; otherwise, process 900 flows from block 908 to block 954. As previously mentioned, a plurality of components may be selected by a user; if so, process 900 flows from block 908 to block 910 for any selected configurable components and from block 908 to block 954 for any selected non-configurable components.

At block 910, a list of one or more user-selectable templates for the user-selected configurable component is optionally presented to the user via the graphical user interface. Process 900 proceeds from block 910 to block 912, where user-selected templates are received for the configurable component. Process 900 continues from block 912 to block 914, where a list of one or more user-selectable parameters for the user-selected configurable component is presented to the user via the graphical user interface. Process 900 proceeds from block 914 to block 916, where user-selected parameters are received for the configurable component. Blocks 910 to 916 may be performed, for example, as discussed above with reference to blocks 310 to 316 of FIG. 3.

Process 900 continues from block 916 to block 940. At block 940, a list of one or more code-generation-strategy user-selectable templates for the user-selected configurable component is presented to the user via the graphical user interface. In some embodiments, the list of code-generation-strategy user-selectable templates may include one or more characteristics of the template that may be set or selected by the user, such as if the template links to another template, component, or project. For example, a selection of a code generation strategy for one component may linked to selected code generation strategy of another component.

The list of code-generation-strategy user-selectable templates can be customized or defined to utilize user-desired user interface elements. Accordingly, the user interface can be customized for the different code-generation-strategy user-selectable templates such that the user can select, define, or set one or more characteristics of the templates. In some embodiments, this customization can specify the user-selectable aspects of the code-generation-strategy templates. In some embodiments, a user may select between mutually-exclusive templates, with only one of the templates being selected to use in the code generation strategy employed in the content generation process for the user-selected configurable component. The templates may allow the user to select hooks to be employed and to configure the selected hooks, as discussed in more detail below.

In various embodiments, block 940 may be optional and may not be performed. For example, in some embodiments, a code-generation-strategy template may be applied by default without a user's selection. In some embodiments, a template may not be employed in the configuration of code-generation-strategy of a configurable component.

Process 900 proceeds from block 940 to block 942, where code-generation-strategy user-selected templates are received for the configurable component. In some embodiments, the code-generation-strategy user-selected template may include other information provided by the user defining how the template is to be used.

In some embodiments, one or more configurable components may include code-generation-strategy user-selectable parameters, but not include code-generation-strategy user-selectable templates. In such an embodiment, blocks 940 and 942 may not be performed for those selected configurable components that do not include code-generation-strategy user-selectable templates.

Process 900 continues from block 942 to block 944, where a list of one or more code-generation-strategy user-selectable parameters for the user-selected configurable component is presented to the user via the graphical user interface. In some embodiments, the list of code-generation-strategy user-selectable parameters may include a list of the parameters and the possible values for those parameters. In other embodiments, the list may identify the parameters and include an interface to receive a user-defined value. In other embodiments, the list may identify the parameters and include an interface to receive a user-defined value limited to some boundaries or selections. In some embodiments, the list of code-generation-strategy user-selectable parameters may include a list of the parameters and the possible values for some of those parameters, and include an interface to receive a user-defined value for other parameters, with or without boundaries. The parameters may include hooks, characteristics of the hooks, etc., to invoke during the code generation process for the user-selected component.

The list of code-generation-strategy user-selectable parameters can be customized or defined to utilize user-desired user interface elements. Accordingly, the user interface can be customized for the different code-generation-strategy user-selectable parameters such that the user can select, define, or set one or more parameters. In some embodiments, this customization can allow the parameter selections to be driven by data from databases, expressions, formulas, or dependencies from other parameters, instead of listing all possible values. In other embodiments, this customization can specify the code-generation-strategy user-selectable aspects of the parameters. In some embodiments, this customization can specify the boundaries applicable to the user-defined values of the parameters. In various embodiments, the list of code-generation-strategy parameters may be a default list for its corresponding component or for a corresponding template.

In some embodiments, this list of code-generation-strategy user-selectable parameters may also include other information that can help the user understand the ramifications of selecting specific parameters. For example, the graphical user interface can include links to reference manuals, diagrams, tool tips, etc. that help explain the parameters and how different user selections can impact other components or parameters.

Process 900 proceeds from block 944 to block 946, where code-generation-strategy user-selected parameters, templates and hooks are received for the configurable component. In at least one embodiment, a value of one or more code-generation-strategy parameters, templates or hooks is received from the user. As mentioned above, the user may select the particular value from the list of possible values for the parameter via the graphical user interface. Alternatively, the user may input the specific value of the parameter, according to boundaries or defined selections if they are specified. Non-acceptable values of user input may trigger user warnings or automatic adjustments (e.g., selecting a default value or overriding a selection based on a selection of another parameter or template, etc.).

In some embodiments, the configurable component may include code-generation-strategy user-selectable templates, but not include code-generation-strategy user-selectable parameters. In such an embodiment, blocks 944 and 946 may not be performed for those selected configurable components that do not include code-generation-strategy user-selectable parameters.

Process 900 continues from block 946 to block 948, where one or more settings structures are generated for the selected configurable component based on the user-selected parameters to configure the component, user-selected templates to configure the component, user-selected code-generation-strategy parameters, user-selected code-generation strategy templates, user-selected hooks, or some combination thereof. In some embodiments, the settings structures may be a list or other data structure identifying the parameters selected by the user and the associated values selected by the user, the templates selected by the user and any customizable features of the selected templates, or other information indicating how the configurable component, code generation strategy or some combination thereof was customized by the user. In some embodiments, one or more code generation strategy descriptors may be generated for the component based on the selected component and the code-generation-strategy settings in the configuration store, as discussed in more detail below.

In various embodiments, the settings structures may be updated by overlaying the user-selected information for the user-selected component to override some values of that component. In some embodiments, a component can override a parameter from another component, such as when components rely on one another for computation. In other embodiments, a component can override a query from another component, such as by changing the choices the user can make associated with that component. Because some parameters can be set or defined by other templates or components, some parameter values may be propagated or overlaid based on the dependencies between parameters, templates, and components. For example, application-level values may override driver-level values. In this way, user selections and changes at the application level can change values or parameters at the driver level, which may then be reflected in the global map or system registry. As mentioned above, in some embodiments the settings structure 224 and the configuration store 222 may be combined. Thus, in some embodiments block 948 may be combined with the next block 950.

Process 900 proceeds from block 948 to block 950, where the configuration store 222 is updated based on the settings for each configurable component and the settings for the code generation strategy for the configurable component. The configuration store is an in-memory object centralizing all the user selections and settings that are generated via the user's selection of configurable components 204, parameters, and templates, including parameters and templates defining code generation strategies for the user's selection of configurable components 204. Accordingly, the parameters, templates, values, and other information selected by the user for the user-selected configurable component are added, updated, or otherwise included in the configuration store for the project based on the settings files. The configuration store may be arranged such that the user-selected values are literals that can be written directly in the hardware unit registers by the driver software of the programmable computing device. In various embodiments, the configuration store may also retain whatever is used to update the result of the expressions, formulas, or dependencies based on the user's selections. In this way, when a value is updated, such as changed by a user via the graphical user interface, all related values are updated accordingly in the configuration store. Creating or updating the configuration store may include creating or updating a code generation strategy descriptor file for a component, such as a software component, of the programmable computing device.

Although FIG. 9 shows the configuration store being updated based on the settings structures being generated from the user's selections, embodiments are not so limited. In some embodiments, the configuration store may be updated in real time as the user selects components, parameters, or templates. Accordingly, in some embodiments, the use of settings structures may be optional. In some embodiments, an image of the user selection may be maintained in the JSON files.

After block 950, or if, at decision block 908, the selected component is not configurable, then process 900 flows to block 954. At block 954, content for the programmable computing device is generated based on the selected component and the information stored in the configuration store 222, including code-generation-strategy settings in the configuration store 222 or the code generation strategy descriptors. It is noted that information stored in the global registry and related to other components may be used to generate content. For example, information related to a DMA associated with the selected component (e.g., a template associated with the DMA) may be employed to generate content associated with the selected component.

As described herein, the graphical user interface allows the user to select components and values. In other embodiments, this can be performed without a graphical user-interface, through a command line interface.

In some embodiments, the graphical user interface may also present a content preview to the user based on the currently selected parameters. In this way, the content generation can be triggered each time a parameter is set. When all components are configured, the content may be finally generated for the programmable computing device because all values are available with the desired values (overlays applied, expressions/formulas/dependencies computed, code generation strategy applied).

Process 900 proceeds from block 954 to decision block 956, where a determination is made whether the user is to select another component. If another component is selected, process 900 loops from block 956 to block 906 to receive the user selection of the other component; otherwise, process 900 flows from block 956 to block 958. Process 900 may also be performed with the user selecting multiple components, which can then be configured by the user together or individually.

At block 958, the content generated for each user-selected component is built into one or more binary images for the project. A binary image is the information usable by the programmable computing device to initialize, configure, or control its hardware, software, or a combination thereof. In some embodiments, all generated content is utilized to build the binary image for the project. In other embodiments, a portion, but not all of the generated content, is utilized to build the binary image for the project. For example, in the case of interpreted languages, only specific content (e.g., generated code) may be uploaded in a specific memory region of the programmable computing device without regenerating the binary interpreting it.

As illustrated, process 900 proceeds from block 958 to block 960, where the binary image(s) is provided to the programmable computing device. In some embodiments, process 900 may sometimes return to block 904 from block 958, using the content generated at 958 as an intermediate input to the process. In some embodiments, process 900 may be executed multiple times to generate different content for different configurations of the programmable computing device. In this way, different configurations can be provided to separate programmable computing devices (even if a same type of programmable computing device), or different configurations can be provided to a single programmable computing device to allow a user of the programmable computing device to change between the different configurations. After block 960, process 900 terminates or otherwise returns to a calling process to perform other actions.

Embodiments of the process 900 illustrated in FIG. 9 may have more process blocks than illustrated, may have fewer process blocks than illustrated, and the process flow may be modified in various ways. For example, process 900 may be modified to include a block presenting configuration update information to the user based on the updated configuration store at 950 (e.g., calling the process 400). In another example, process blocks 910 and 940, and process blocks 912 and 942 may be combined in some embodiments (e.g., the templates may include templates directed to configuring the component, templates directed to configuring the code generation strategy for the component, or templates directed to both configuring the component and to configuring the code generation strategy for the component). Similarly, process blocks 914 and 944, and process blocks 916 and 946 may be combined in some embodiments (e.g., the parameters may include parameters directed to configuring the component, parameters directed to configuring the code generation strategy for the component, or parameters directed to both configuring the component and to configuring the code generation strategy for the component). In another example, the process flow may include parallel processing of process blocks, instead of sequential processes as described. In some embodiments, generating code generation strategy descriptors may be a separate processing block, instead of being part of block 948 as described. In some embodiments, other variations such as those discussed above with references to FIGS. 1-8, may be employed.

Figure 10:
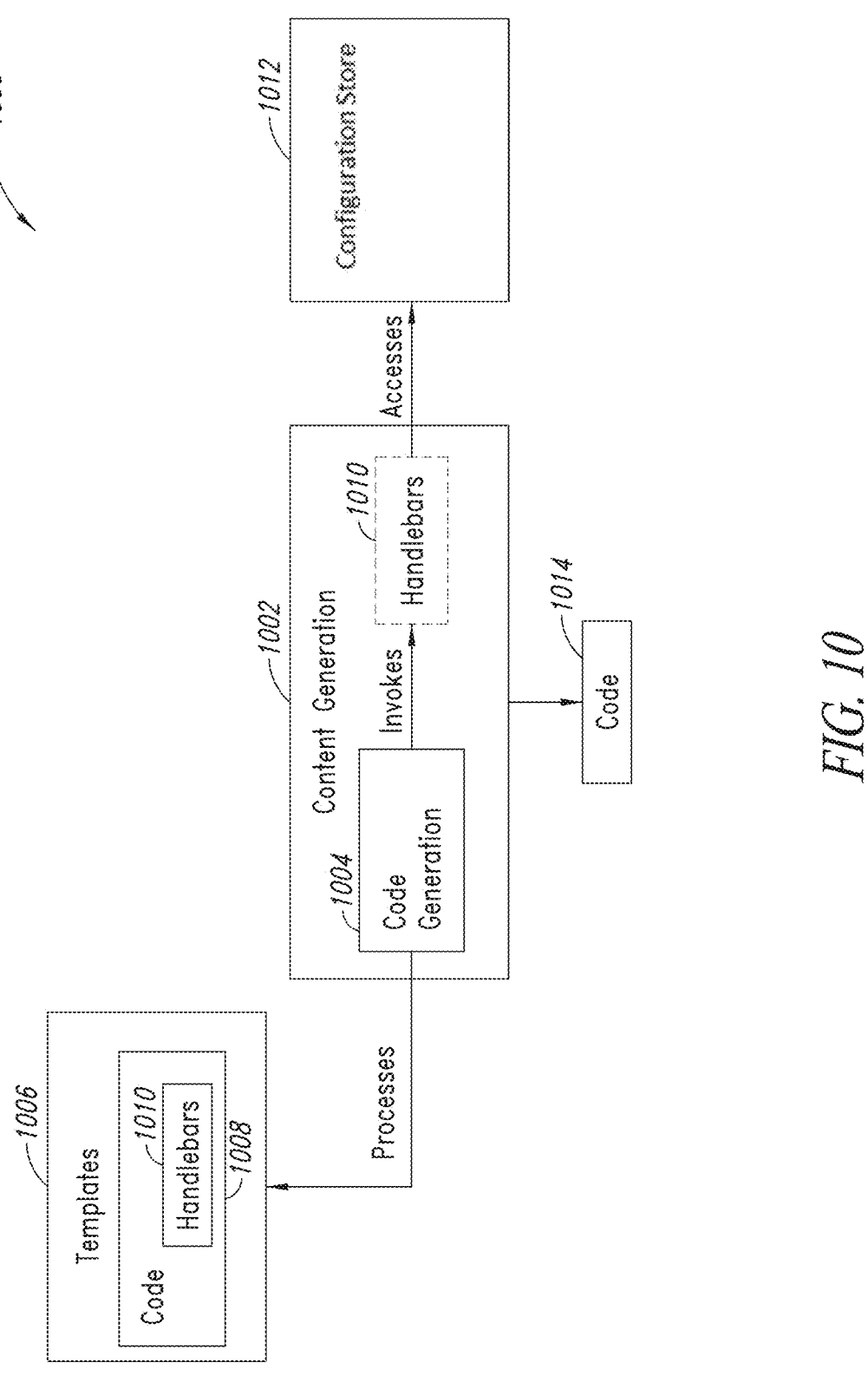
FIG. 10 is a conceptual diagram of a process associated with generating content in accordance with some embodiments described herein.

FIG. 10 is a conceptual diagram of a process 1000 associated with generating content in accordance with some embodiments described herein. For example, the process 1000 may be employed by processing block 954 of FIG. 9. For convenience, FIG. 10 will be described with reference to FIG. 9. A content generation process 1002 includes a code generation routine or process 1004. The code generation routine 1004 processes templates 1006 associated with a component to be configured (e.g., templates to configure a component selected at block 912 of FIG. 9, templates to configure a code generation strategy for a component selected at block 942, etc., or combinations thereof). The templates may include code 1008 instrumented with handlebars 1010. The code generation routine 1004 may invoke one or more handlebars 1010 to access information in the global map or system registry 1012 to configure the component, the code generation strategy for the component or combinations thereof. The accessed information may be employed to generation a code portion 1014 of the content. The information may include, for example, information specifying how to use the input information (e.g., templates 1008, settings, parameters, etc.), how to produce the output results (e.g., combine templates, use variations of templates, etc.) and how to organize the generated artifacts (e.g., number of files, names, locations to store the artefacts).

Figure 11:
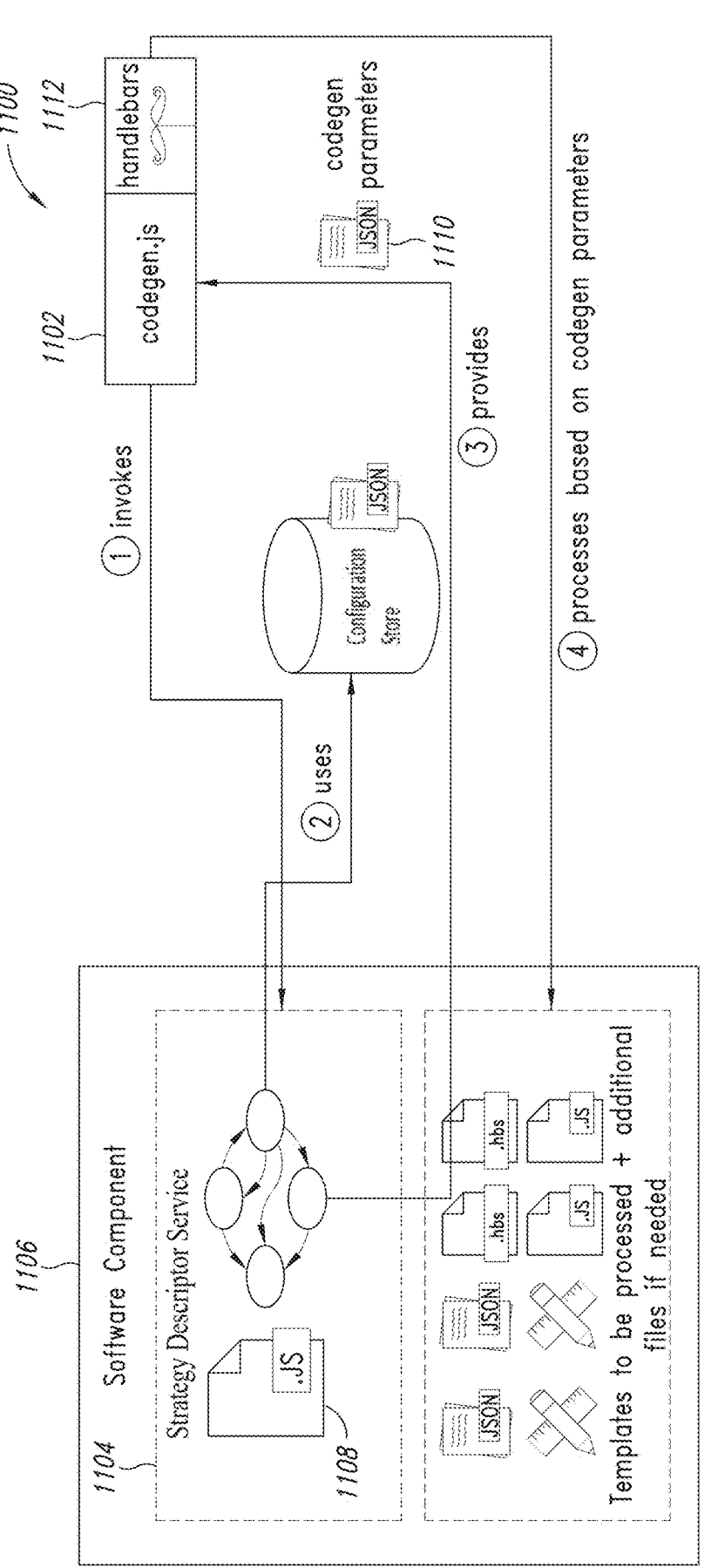
FIG. 11 is a conceptual diagram of a content generation process which facilitates customizing a code generation strategy associated with a software component in accordance with some embodiments described herein.

FIG. 11 is a conceptual diagram of a flexible content generation process flow 1100 associated with generating content in accordance with some embodiments described herein, which facilitates customizing a code generation strategy associated with a software component. For example, the process 1100 may be employed by processing block 954 of FIG. 9. A content generation service 1102, as illustrated codegen.js, invokes (act 1 as illustrated) a hook (see FIG. 12) to a strategy descriptor service 1104, which may be included as a deliverable with a software component 1106. The selected code generation service may vary for different software components.

The strategy descriptor service 1104 facilitates providing the code generation service with information related to a user-selected code generation strategy for the software component, such as templates to be processed, how to process the templates, applicable parameters, applicable file names, etc. Other information related to a user-selected code generation strategy may be provided as well, such as a list of hardware resources used by the software component. The strategy descriptor service 1104 may comprise code 1108 to generate a list of inputs 1110 to the code generation service, which the code generation service 1102 uses to implement the selected code generation strategy. As illustrated, the strategy descriptor service 1104 includes a JS code (e.g., JavaScript code) 1108 which when executed retrieves (act 2 as illustrated) at least some of the information related to the user-selected code generation strategy from the global map/ system registry. The information related to the user-selected code generation strategy is provided (act 3 as illustrated) to the code generation service 1102, as illustrated, in a form of an object such as a JSON code generation parameters file 1110. The code generation service uses a handlebars engine 1112 on the selected templates in accordance with the provided information (e.g., parameters of the code generation parameters file 1110). The provided information may include additional information in various embodiments. The scope of the invocation of hook to a template may also be defined (e.g., before all, after all, before each, after each, etc.), the resources to which the hook applies may be defined (e.g., before each component processes, before each template resolution, etc.). Different hooks may be employed at different stages of the code generation process.

FIG. 12 illustrates an example of a hook 1200 that may be used by a code generation service, such as the code generation service 1102 of FIG. 11, and will be described for convenience with reference to FIG. 11. The hook 1200 is employed by a code generation service to invoke a code generation strategy parameters file 1110 and to process (act 4 as illustrated) templates, parameters, etc., associated with the software component 1106 based on the information related to the user-selected code generation strategy provided (act 3) to the code generation service 1102 in an object generated using the strategy descriptor service, such as a code generation parameters file 1110.

Figure 13:
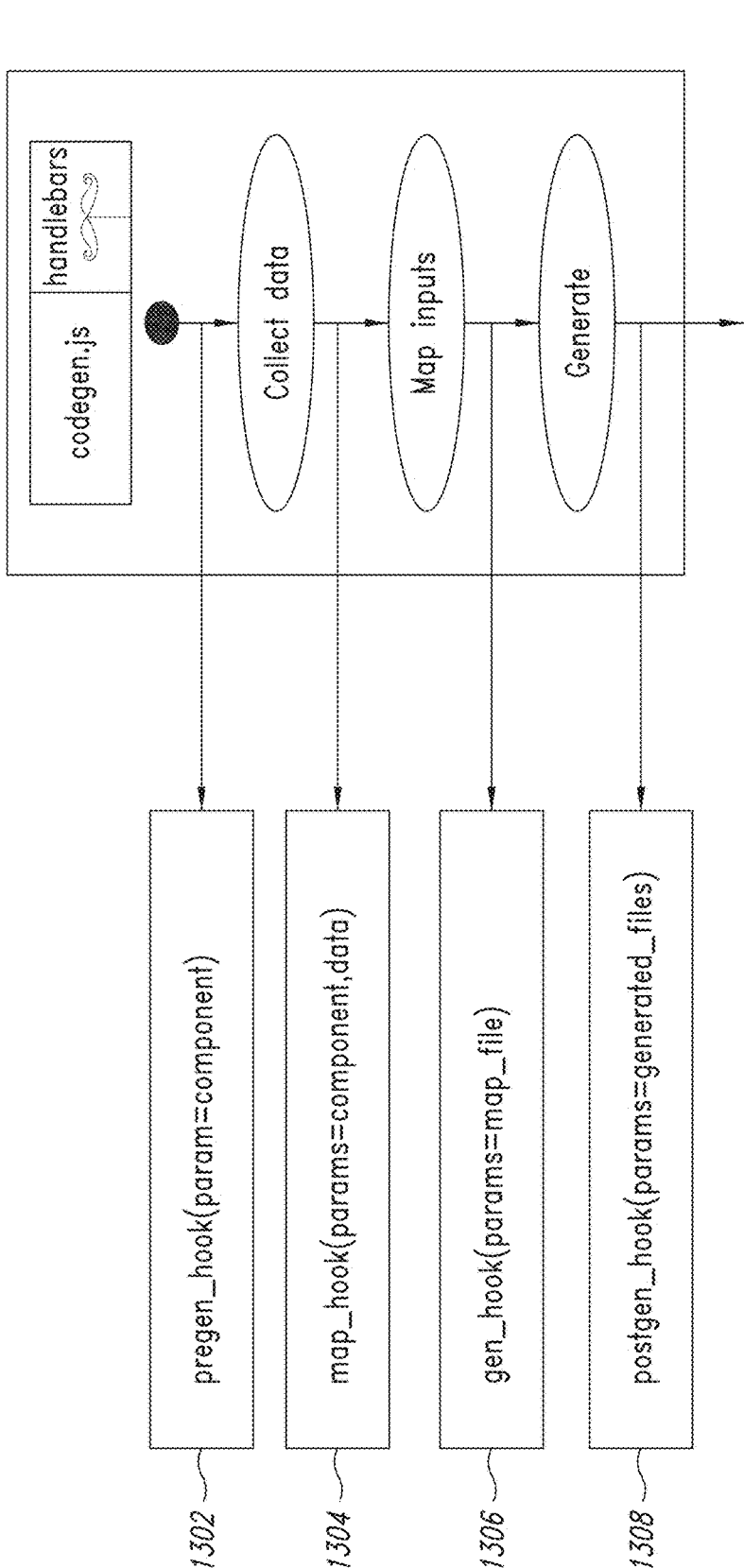
FIG. 13 is a conceptual diagram illustrating use of different hooks at different code generation stages in accordance with some embodiments described herein.

As mentioned above, different hooks may be employed at different stages of the code generation process. FIG. 13 is a conceptual diagram illustrating example use of different hooks at different code generation stages in a code generation process flow 1300 in accordance with some embodiments described herein. As illustrated, a pre-generation hook 1302 is employed at a pre-generation stage, for example, to identify the component or components for which code is to be generated, the hooks to be employed in subsequent stages, etc. The parameters of the pre-generation hook 1302 include the component, and data associated with a code generation strategy for the component is collected, such as via a code generation strategy descriptor file.

A mapping hook 1304 is employed at a component mapping stage, for example, to retrieve mapping data associated with the component. The parameters of the mapping hook 1304 include the component and mapping data associated with the component (e.g., component settings generated at block 948 of FIG. 9 based on user selections). A code generation hook 1306 is employed at a code generation stage, for example, to retrieve a mapping file associated with the component.

For example, a mapping file may indicate the code is to be generated to produce code having the following order i) global data declarations; ii) public functions; and iii) private functions. A post-generation hook 1308 is employed at a post-generation stage, for example, to retrieve information associated with post code generation processing, such as locations to which the generated code may be stored. For example, a post-generation hook may be used to refactor the order of the code to i) global data declarations; ii) private functions; and iii) public functions.

FIG. 14 illustrates an example of code 1400 of a strategy descriptor service that may be employed to generate a code generation parameters file to be provided to a code generation service. With reference to FIGS. 10 through 12, the code 1400 may be employed as the code 1108 included in the strategy descriptor service 1104 to generate the code generation parameters file 1110 to be provided to the code generation service 1102 in accordance with a hook 1200 invoked by the code generation service. The code 1400 may take the form of a JSON file, a YML file, a memory object, etc. In the illustrated example of FIG. 14, when the code 1400 is executed, a list of hardware resources for the software component is retrieved, (HwInstanceList=getHWInstanceList('componentID: yyyID'), with the component ID represented by yyyID. A loop is performed on the list of hardware resources. For each template associated with a hardware resource, a loop is performed to define an output file based on a template file name (_template) customized with a hardware resource identifier (_hwinstance). An object 1402 is returned (e.g., a map) associating each hardware resource to an output file name. At the code generation stage (see, e.g., 1004 of FIG. 10), the template is processed with the resource as a parameter, and a result is stored in the indicated filename.

Figure 16:
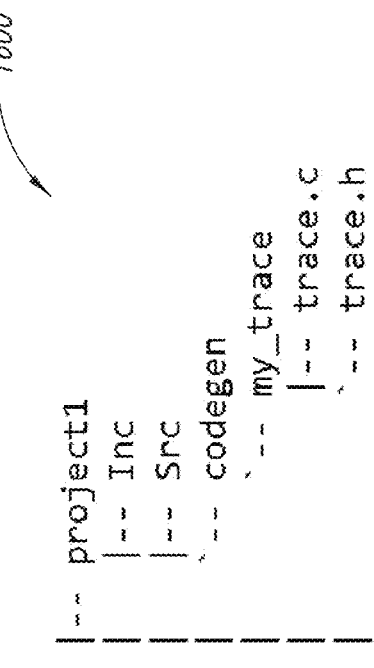
FIG. 16 illustrates an example structure of an output code generated by a code generation service using a code generation parameters file in accordance with some embodiments disclosed herein.

FIG. 15 illustrates an example of a code generation parameters file 1500 that may be generated in response to the invocation of a strategy descriptor service by a code generation service. With reference to FIG. 11, the code generation parameters file 1500 may be generated as the code generation parameters file 1110 in response to invocation of the strategy descriptor service 1104 associated with a component (including execution of code 1108 included in the strategy descriptor service 1104). As illustrated, the code generation parameters file includes an "id" which identifies the code generation strategy, and a generation parameter, which as indicated is set to forced. Groupings of sets of template files are identified. FIG. 16 illustrates an example structure 1600 of an output code generated by a code generation service using the code generation parameters file 1500 of FIG. 15.

FIG. 17 illustrates an example of a code generation parameters file 1700 that may be generated in response to the invocation of a strategy descriptor service by a code generation service. With reference to FIG. 11, the code generation parameters file 1700 may be generated as the code generation parameters file 1110 in response to invocation of the software descriptor service 1104 associated with a component (including execution of code 1108 included in the strategy descriptor service 1104). As illustrated, the code generation parameters file includes an "id" which identifies the code generation strategy, and a generation parameter, which as indicated is set to forced. Groupings of sets of template files are identified. FIG. 18 illustrates an example structure 1800 of an output code generated by a code generation service using the code generation parameters file 1700 of FIG. 17.

Figure 19:
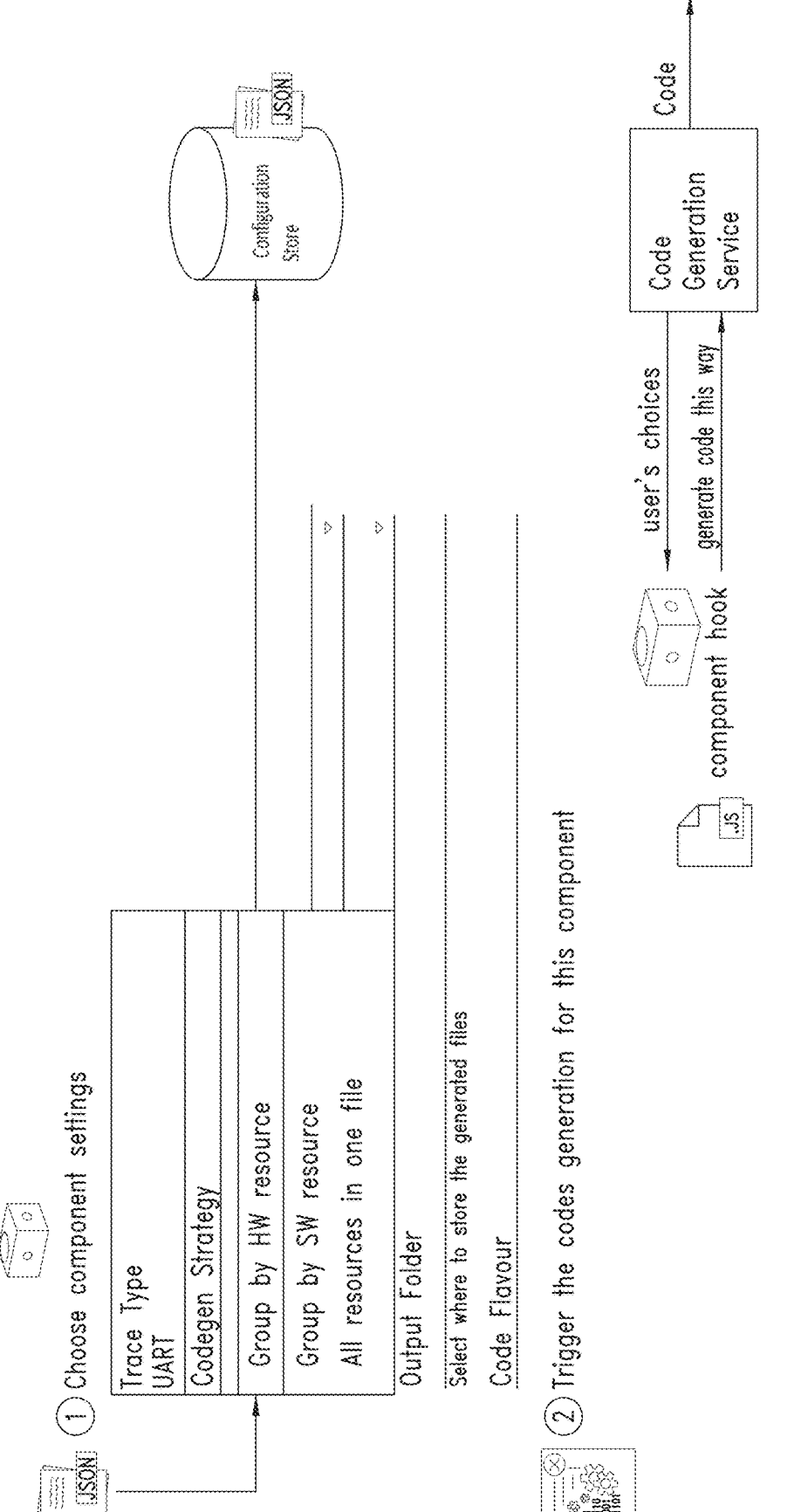
FIG. 19 is a conceptual diagram illustrating an example of customizing a feature of a code generation strategy for a component in accordance with some embodiments disclosed herein.

FIG. 19 is a conceptual diagram illustrating an example of customizing a feature of a code generation strategy for a component, as illustrated, a UART. At 1, settings for the UART are chosen by a user, for example via a user interface as discussed above with reference to FIGS. 3 and 9. As illustrated, the settings include a code generation trace type setting, a code generation strategy output folder, and a code flavor parameter for the UART. A drop-down menu is presented to a user in a user interface to select a trace type strategy for the UART. Drop down menus may be presented for other code generation strategy settings, data entry fields may be provided (e.g., to identify an output folder), etc., and various combinations thereof. Default values may be employed (e.g., if no output folder is specified, a default output folder may be employed). The selected strategy as illustrated includes a trace type strategy of generating one set of code files per hardware resource associated with the UART. The selection is stored in a global map (for example, in a JSON file) as part of a code generation strategy descriptor. The user interface may present additional code generation options to the user, and at levels other than a component level. For example, a user may be able to select settings to be applied at various granularities, such as a project level granularity, a component level granularity, etc. A scope drop down menu may be employed to facilitate selecting a granularity level associated with a code generation strategy setting.

At act 2 as illustrated, generation of the code for the component, e.g., a UART, is triggered. A code generation service invokes a component hook to retrieve the code generation settings chosen by the user for the component, and a component generation parameters file is provided to the code generation service to indicate how the code is to be generated. The code generation service generates the code in accordance with an object provided based on the content of the component generation parameters file.

Figure 20:
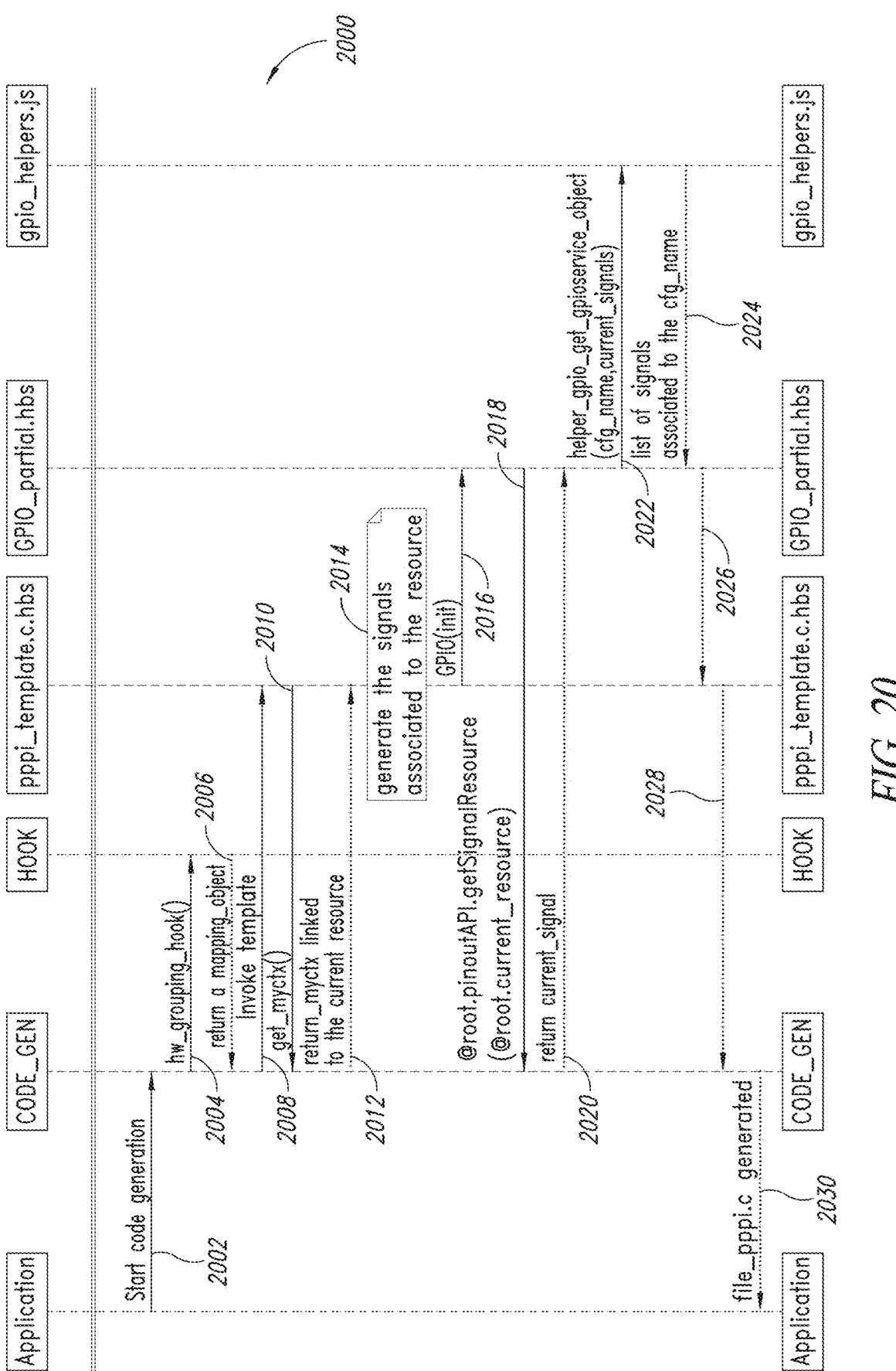
FIG. 20 is a flow diagram illustrating an example process to generate code for a component in accordance with some embodiments disclosed herein.

FIG. 20 is a flow diagram of a process 2000 to generate code for a component that may be employed, for example, in process 900 of FIG. 9, and will be described, for convenience, with reference to FIGS. 9-19. The code generation process 2000 begins with an application initiating 2002 a code generation routine or block. For example, process 900 of FIG. 9 may initiate block 954. The code generation routine invokes 2004 a hook, for example, a hook (e.g., hook 1200 of FIG. 12, hooks 1302, 1304, 1306, 1308 of FIG. 13) to retrieve code generation strategy information using a strategy descriptor service, such as the strategy descriptor service 1104 of FIG. 11. The hook may be, for example, a javascript function delivered as a file with the component for which code is being generated. The hook triggers executing of code 1108 of the strategy descriptor service 1104, which generates a mapping object that is returned 2006 by the hook to the code generation routine. For example, a code generation parameters file (see code generation parameters files 1500 and 1700 of FIGS. 15 and 17) may be returned to the code generation routine or service. The code generation service invokes 2008 a template identified for the component (e.g., in the object), which indicates to the code generation routine how to process the information provided by the system registry for the component.

Specific code generation processes may be specified by the hook and the templates employed, and thus may be different for different hooks and templates. In the illustrated example, the template requests 2010 information related to a current resource associated with the component, as illustrated, using a get_myctx command. The information may include configuration information associated with the resource (e.g., signal couplings, etc.). The code generation service returns 2012 the requested information related to the current resource to the template. The template processes the information and generates 2014 configuration signal information associated with the resource.

Figure 21:
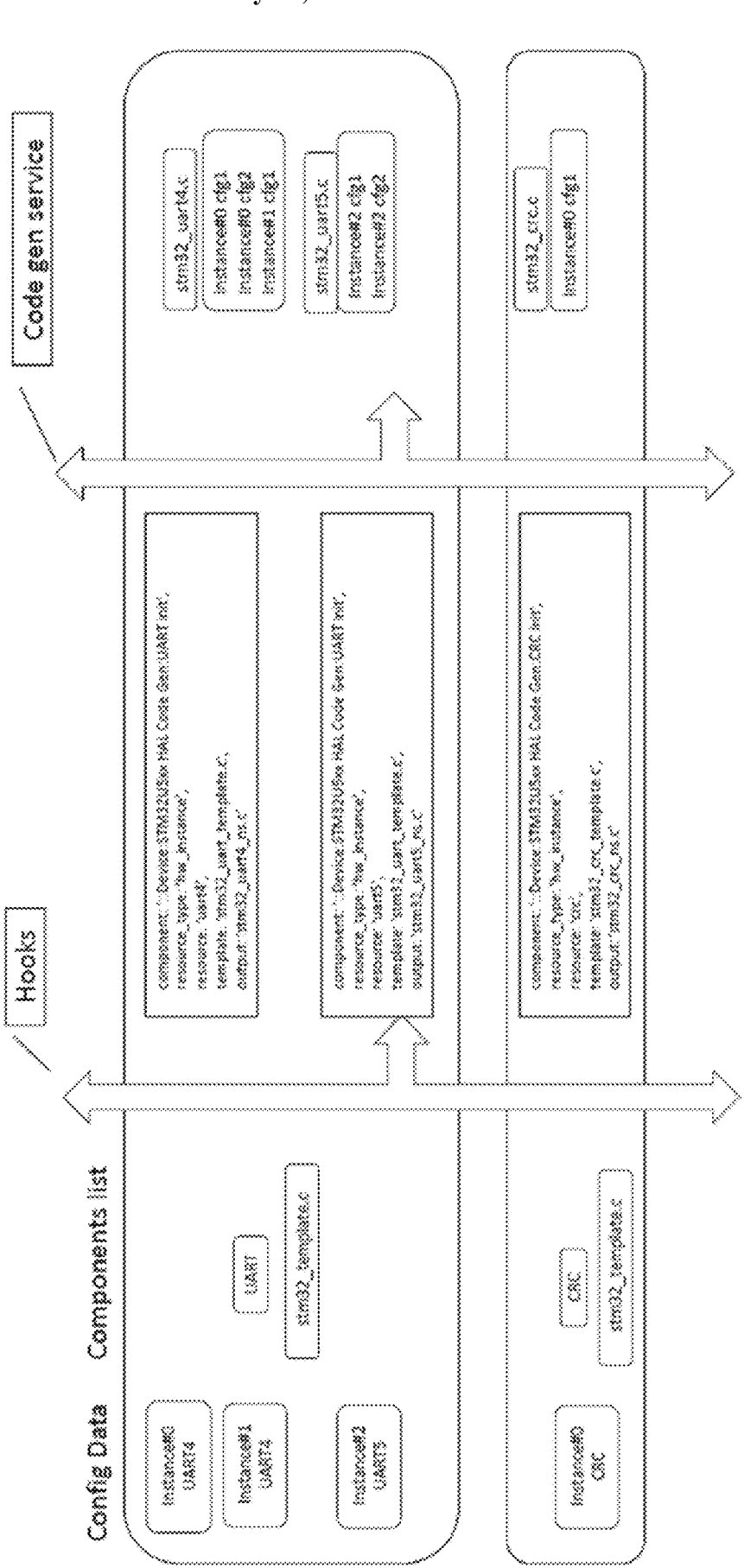
FIG. 21 is a conceptual diagram illustrating the use of hooks by a code generation service to generate code for components of a programmable computing device in accordance with user selections in accordance with some embodiments disclosed herein.

FIG. 21 is a conceptual diagram illustrating the use of hooks by a code generation service to generate code for components of a programmable computing device in accordance with user selections. The code generation service invokes the hooks, which generate objects and provide the objects to the code generation service. The objects identify the templates to be used to generate programming code for the respective components and how to use the templates. The code generation service uses the objects to generate the code using the templates in accordance with the user-selected code generation strategies.

The code generation configuration strategy facilitates providing component designers with increased flexibility and control to configure a programmable computing device. The designer may define the options to be presented to a user (e.g., the template, parameter, and hook options to present, for example, by defining a parameters.json file. The designer may define the hooks, which define how to process the user settings. The designer may define the templates, which define how to process the user's choices (e.g., an input object) to change the result of the code generation process.

At the same time, a generic code generation service may be employed. The code generation service obtains the customized user selection by invoking a hook. The hook may be defined in the global registry (e.g., based on user's inputs for instance), or a global hook may be called to retrieve customization information based on user's inputs (e.g., stored as settings in the global registry). The code generation service passes an input object returned by the hook to an identified template, and the template uses the object to implement the coding strategy for the component.

The hooks may be declared in a component description (e.g., a pdsc file in the global registry), so hard-coded may be avoid. The code generation service may discover the hooks based on the component description. The use of hooks is optional for a component, and a default code generation strategy may be employed in the absence of hooks. Flexibility as to the selection of a code generation service also is facilitated, as the hooks may be invoked based on a component description by a generic coding service.

Figure 22:
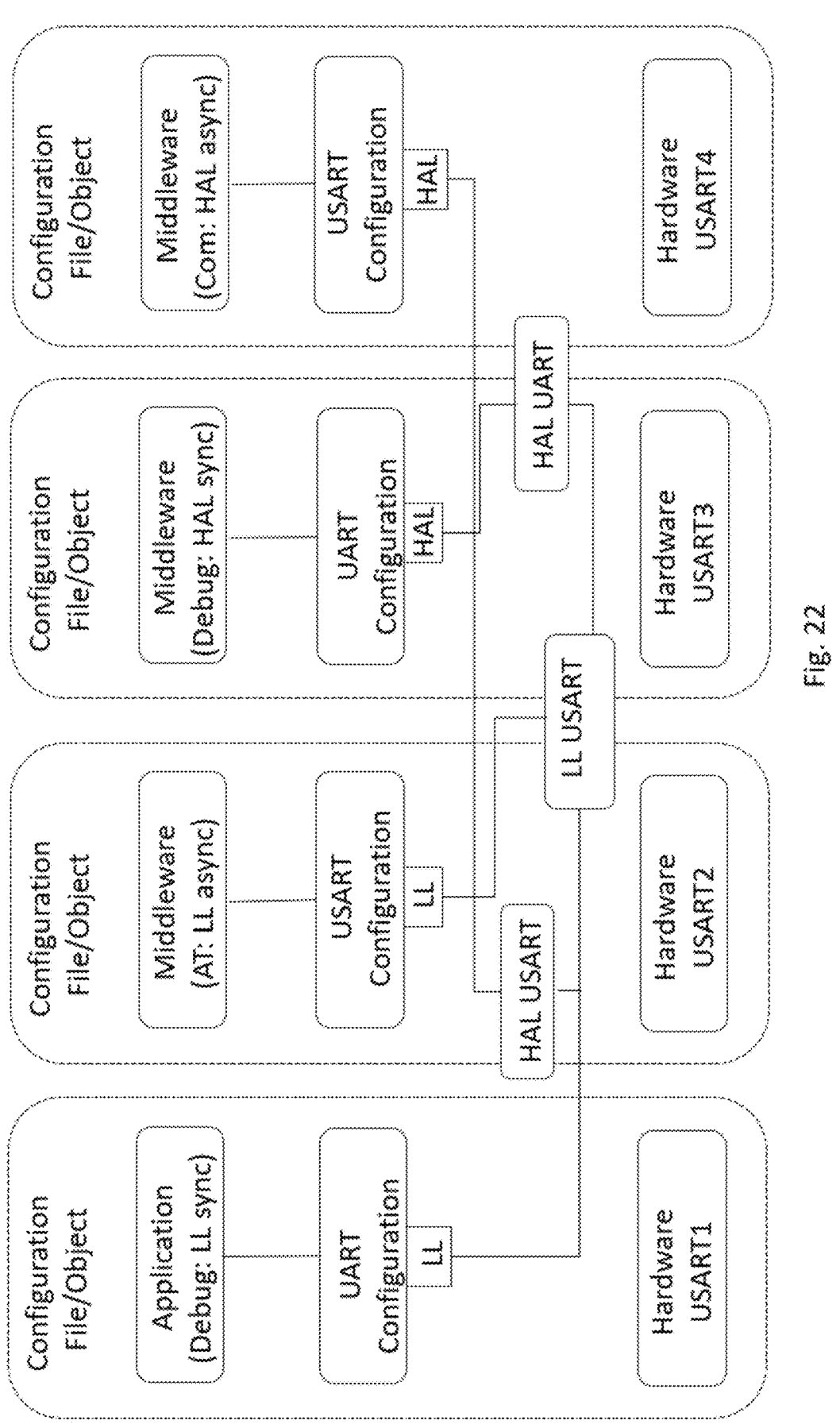
FIG. 22 conceptually illustrates generating objects for a configuration store based on specific hardware and specific software configuration pairs of a programmable computing device.

With reference to FIGS. 1-21, one approach is to present a list of specific components to a user to select for configuration. See, for example, block 304 of FIG. 3 and block 904 of FIG. 9. The user may start from a particular hardware component of a programmable device (e.g., a particular UART, such as UART4), and the particular hardware component may be configured with respect to a particular software component (e.g., a software component implementing a specific UART functionality, such as synchronous, asynchronous, smartcard or infrared (IrDA), with a specific driver or API (e.g., HAL, LL)). Similarly, the user may start from a particular software component, and the particular software component may be configured with respect to a particular hardware component. The configuration options presented are tightly coupled to the particular hardware component and the particular software component selected. A configuration file or object is generated for each particular hardware component and particular software component pair. This is conceptually illustrated in FIG. 22. Of course, the same hardware component (e.g., UART4) can have two different configurations, resulting in two pairs.

While this approach may be useful, for example, when it is desired to use a particular hardware component or a specific software driver, it is not always very flexible. The user must know a specific hardware component or a specific software component from which to start, and the selection of settings for the configurable component occurs after the corresponding hardware or software component is selected. Thus, to make appropriate choices in an efficient manner, a user must have knowledge of both the specific hardware components available and the specific software components available.

In addition, configurations in which specific hardware components are used with multiple software components, or configurations where specific software components are used with multiple hardware components, may generate a large number of separate configuration files or objects, and these files may each be quite large. This may increase the complexity of the content generation process, including the refining of the conditions and the resolution of conflicts between selected configuration options. Moreover, conflicts with other component configurations may not be detected until after the complete configuration of a number of specific hardware component and particular software component pairs. Thus, when a conflict is detected, the configuration process needs to start over with respect to one or more of the pairs.

Similarly, if a user decides to select a different specific hardware component (e.g., to avoid a conflict, because another hardware component utilizes a more convenient pin position, etc.), the user must start the configuration process for the configurable component over from the beginning of the configuration process.

Instead of starting from specific hardware component and specific software component pairs, a more flexible approach is to select and configure a versatile component (e.g., exposing all of the features of a type of hardware IP), without specifying at the beginning of the configuration process a specific hardware component (e.g., a specific UART) and an associated configuration component dedicated to one specific feature of the hardware IP component (e.g., without specifying a specific mode of a specific UART hardware component (e.g., UART1) configured with a specific software API, such as a synchronous UART protocol configured through a STM32 HAL driver API). An object storing the configuration information for the versatile component is created and stored, and may be flexibly associated with particular hardware components and software components when convenient during the configuration process (e.g., during configuration of the versatile component based on some initial selections, during the creation or updating of a configuration store, during the content generation process, or combinations thereof). Examples of an approach of configuring a versatile component are conceptually illustrated in FIGS. 23 and 24.

Figure 23:
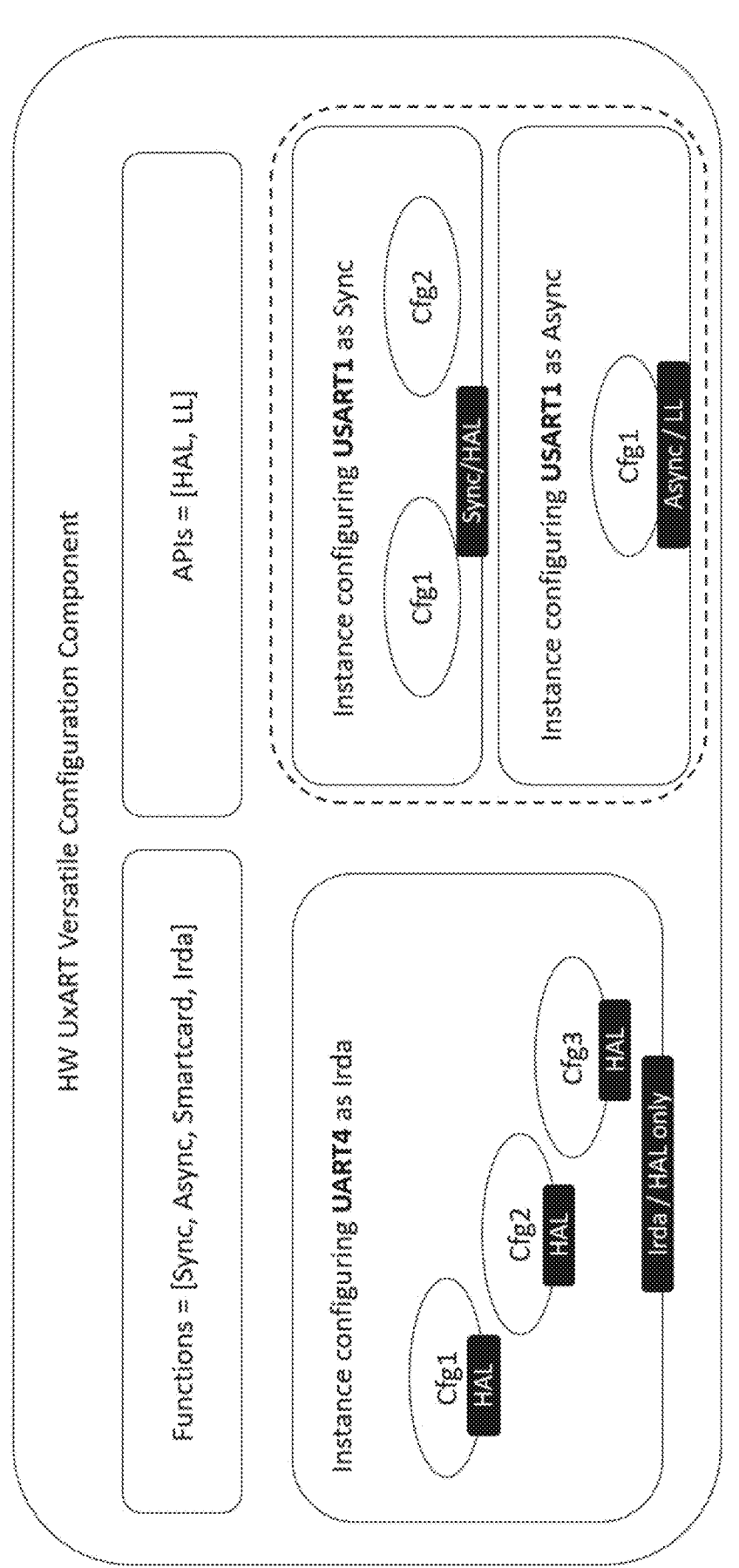
FIGS. 23 and 24 are conceptual illustrations of configuring versatile components, which may flexibly be associated with specific hardware and software components of a programmable computing device.
Figure 24:
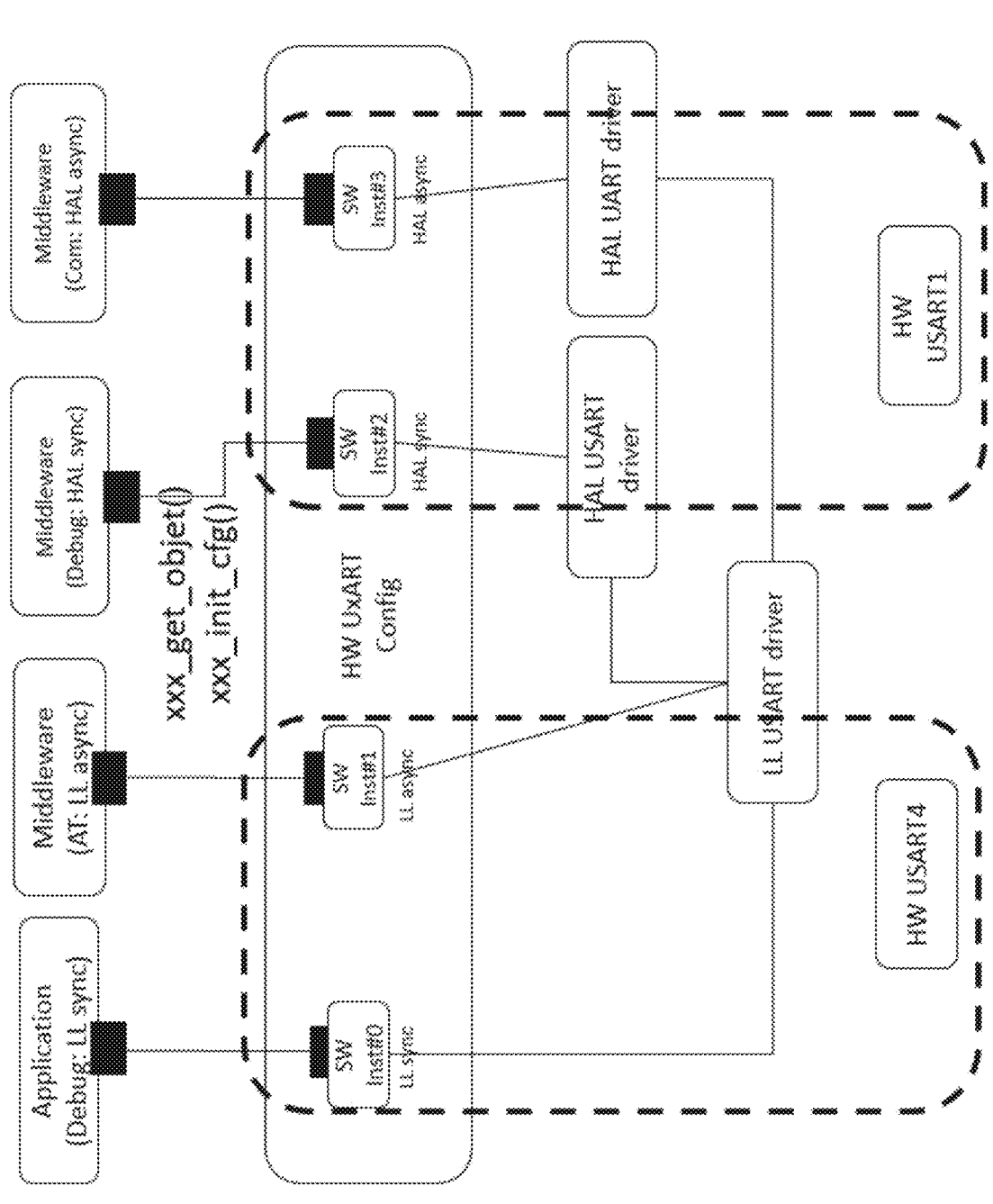

With reference to FIGS. 23 and 24, a user selects a versatile component to configure, as illustrated, a versatile HW UxART component. The user may create multiple instances of configurations for the versatile component, as illustrated in FIG. 24, Inst#0, Inst#1, Inst#2 and Inst#3. A user may be asked to select a logical function or protocol for each instance of the versatile component (e.g., synchronous communications, asynchronous communications, smardcard functionality, IrDA functionality) and a type of API (e.g., HAL, LL, etc.). Based on the user-selected function or protocol and the user-selected API type, the configuration process can identify available specific hardware components and drivers to associate with an instance of a versatile component configuration. The user does not need to know ahead of time which specific hardware components or software components (e.g., drivers) support the desired versatile component configuration.

For example, with reference to FIG. 24, a user may select a synchronous protocol with an LL API for versatile component instance Inst#0. The code generation process knows that available hardware component USART4 supports the requested configuration with an LL USART driver, and versatile component instance Inst#0 is associated with hardware component USART4 and software component LL USART driver. In some embodiments, more than one available hardware component may be able to provide the requested functionality, and a user may be presented with a list of available hardware components to provide the requested functionality. Similarly, more than one available software component may be able to provide the requested functionality, and a user may be presented with a list of available software components to provide the requested functionality. In some embodiments, the configuration process may automatically select one of the available components to provide the requested functionality, for example, based on a conflict analysis or a selection criteria. Combinations of user selections and automatic selections may be employed.

In another example, a user may select an asynchronous protocol with an LL API for versatile component instance Inst#1. The configuration process knows that available hardware component USART4 supports the requested configuration with an LL USART driver, and versatile component instance Inst#1 is associated with hardware component USART4 and software component LL USART driver.

In another example, a user may select a synchronous protocol with a HAL API for versatile component instance Inst#2. The configuration process knows that available hardware component USART1 supports the requested configuration with a HAL USART driver, and versatile component instance Inst#2 is associated with hardware component USART1 and software component HAL USART driver. As illustrated, the HAL USART driver depends on a LL USART driver. The configuration process knows the dependency of the HAL USART driver and generates a dependency condition, which may be resolved in a subsequent dependency resolution process. However, this is an example, and HAL USART drivers of various embodiments may not depend on an LL driver. Similarly, a user may select an asynchronous protocol with a HAL API for versatile component instance Inst#3. The configuration process knows that available hardware component USART1 supports the requested configuration with a HAL UART driver, and versatile component instance Inst#3 is associated with hardware component USART1 and software component HAL UART driver.

Figure 25:
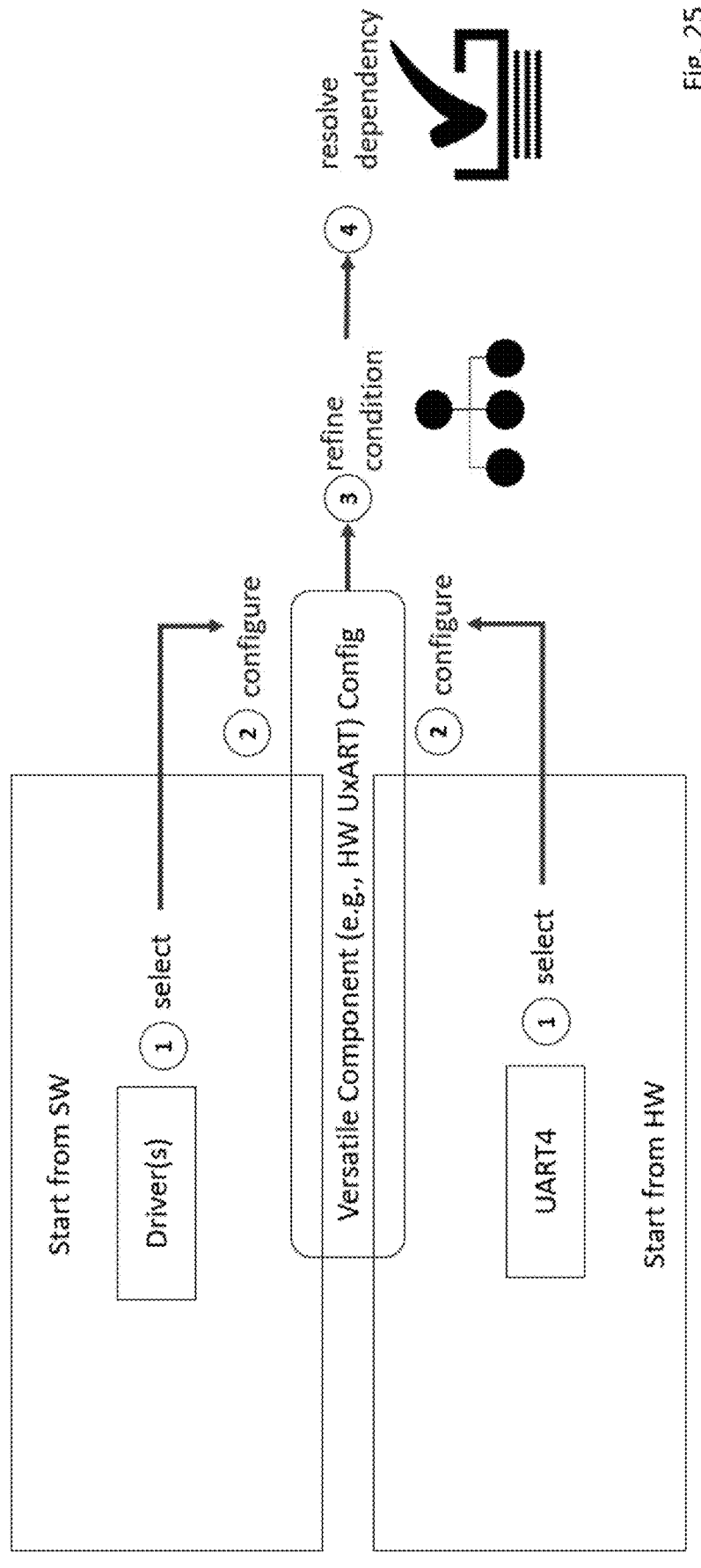
FIG. 25 is a conceptual diagram illustrating a process for generating content which allows a user to select between configuring a hardware component (e.g., a specific UART), configuring a specific software component (e.g., a specific driver), or configuring a versatile component (e.g., a HW UxART).

FIG. 25 is a conceptual diagram illustrating a process for generating content which allows a user to choose between selecting a hardware component (e.g., a specific UART), and then configuring a compatible versatile component (the "Start from HW" flow), or selecting a software component (e.g., a UART driver), and then configuring a compatible versatile component (the "Start from SW" flow), or selecting and configuring a versatile component, and then selecting appropriate hardware components and software components to associate with the versatile component.

A user familiar with the available hardware components (e.g., hardware components providing multiple functionalities), or a user who wants to use a specific hardware component, may decide to start, 1, from a specific hardware component (e.g., UART4), and may configure, 2, a compatible versatile component (e.g., HW UxART). A user familiar with the available software components (and the organization thereof), may decide to start, 1, from a specific software component (e.g., a specific driver), and may configure, 2, a compatible versatile component (e.g., HW UxART). Additionally, a user unfamiliar with the available hardware components and the available software components, or a user who simply wants a particular type of functionality, may decide to start from a versatile component instance (e.g., logical HW UxART) to provide, for example, serial communication services, and may configure the versatile component, for example, as discussed below with reference to FIGS. 26-28. A user may combine the three approaches, configuring some components by starting with specific hardware, some components by starting with specific software, and some components by starting with versatile component instances.

At 3, conditions associated with the various configurations may be refined, leading to a versatile component being associated with a complementary hardware component (in the "Start from SW" flow), or being associated with a complementary software component (in the "Start from HW" flow), or both if a user started with a versatile component.

At 4, a dependency resolution mechanism selects hardware components, software components, or both, based on the conditions refined at 3, and content for the programmable computing device may be generated (for example, as discussed above with reference to FIGS. 1-21).

It is noted that configuration files and objects generated starting from specific hardware components or specific software components may typically include more conditions that need to be stored in the configuration store, refined, and resolved. For example, UART4 may provide synchronous, asynchronous, smartcard and IrDA functionality. A configuration file or object associated with a configuration generated starting from the physical hardware UART4 may contain all of the conditions associated with each of the functionalities provided by UART4, or may need to have these conditions removed or resolved as part of the condition refinement or content generating process. For example, during the configuration process 2 starting from the UART4 hardware, all of the conditions associated with the functionalities may be set or selected (e.g., default values may be used). During the refine condition process, these conditions may be transformed into conditions to be stored in the configuration store. In contrast, when a configuration file or object is generated starting from a versatile component instance, only conditions associated with the selected functionalities may be carried with the configuration information during the configuration store or object generation processes. This can greatly simplify the condition refinement process at 3 and the dependency resolution process at 4.

Figure 26:
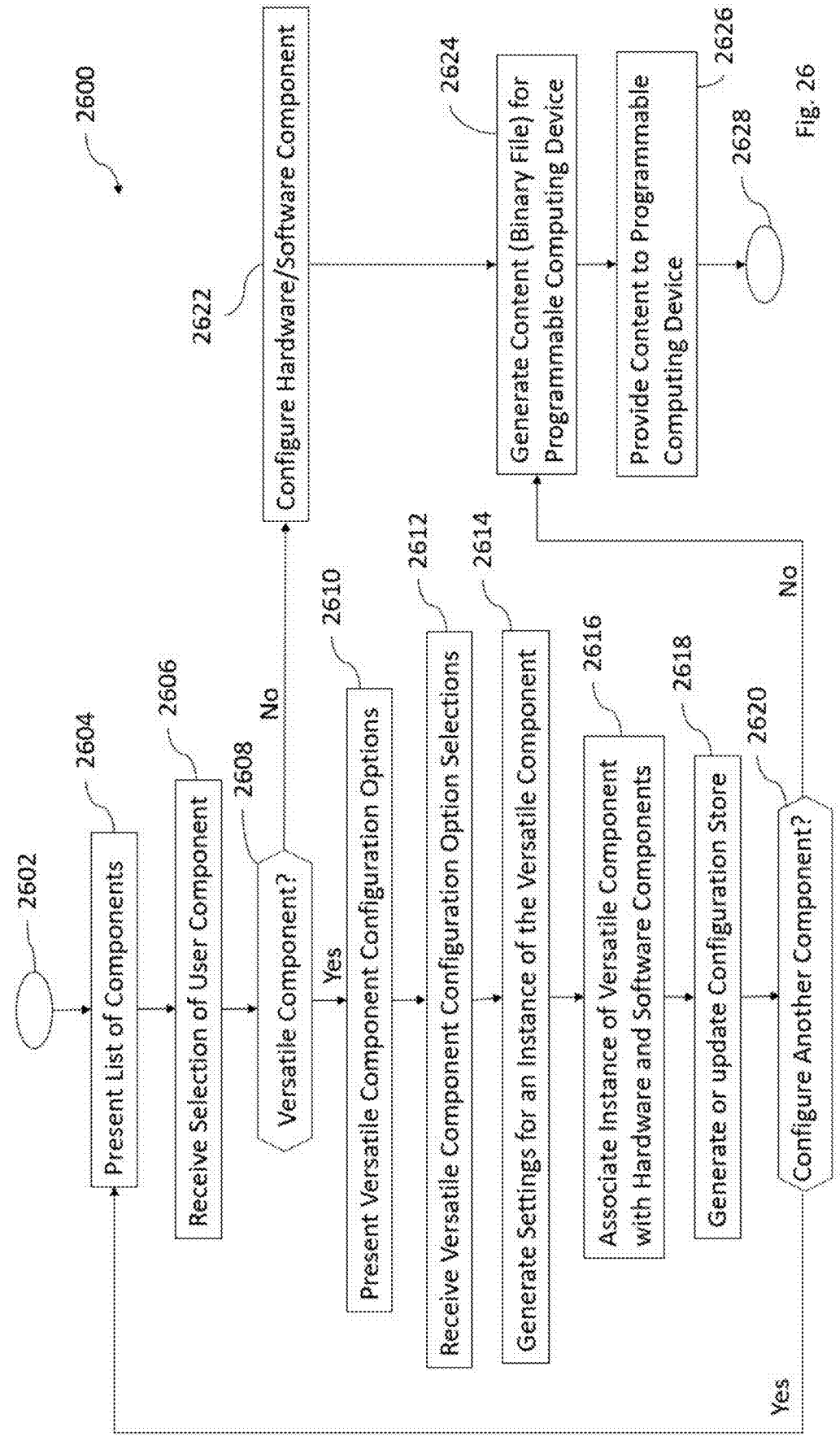
FIG. 26 is a logical flow diagram of a process for customizing a code generation process associated with generating content in accordance with some embodiments described herein.

FIG. 26 is a logical flow diagram of a process 2600 for customizing the code generation process associated with generating content in accordance with embodiments described herein by configuring versatile components. Process 2600 begins, after a start block 2602, at block 2604, where a list of a plurality of components for a project are presented to the user. Block 2604 may be performed, for example, in a manner similar to that discussed above with reference to blocks 302 and 304 of FIG. 3 (e.g., by presenting a graphical interface to a user), with the inclusion of versatile component instances in the list.

Figure 27:
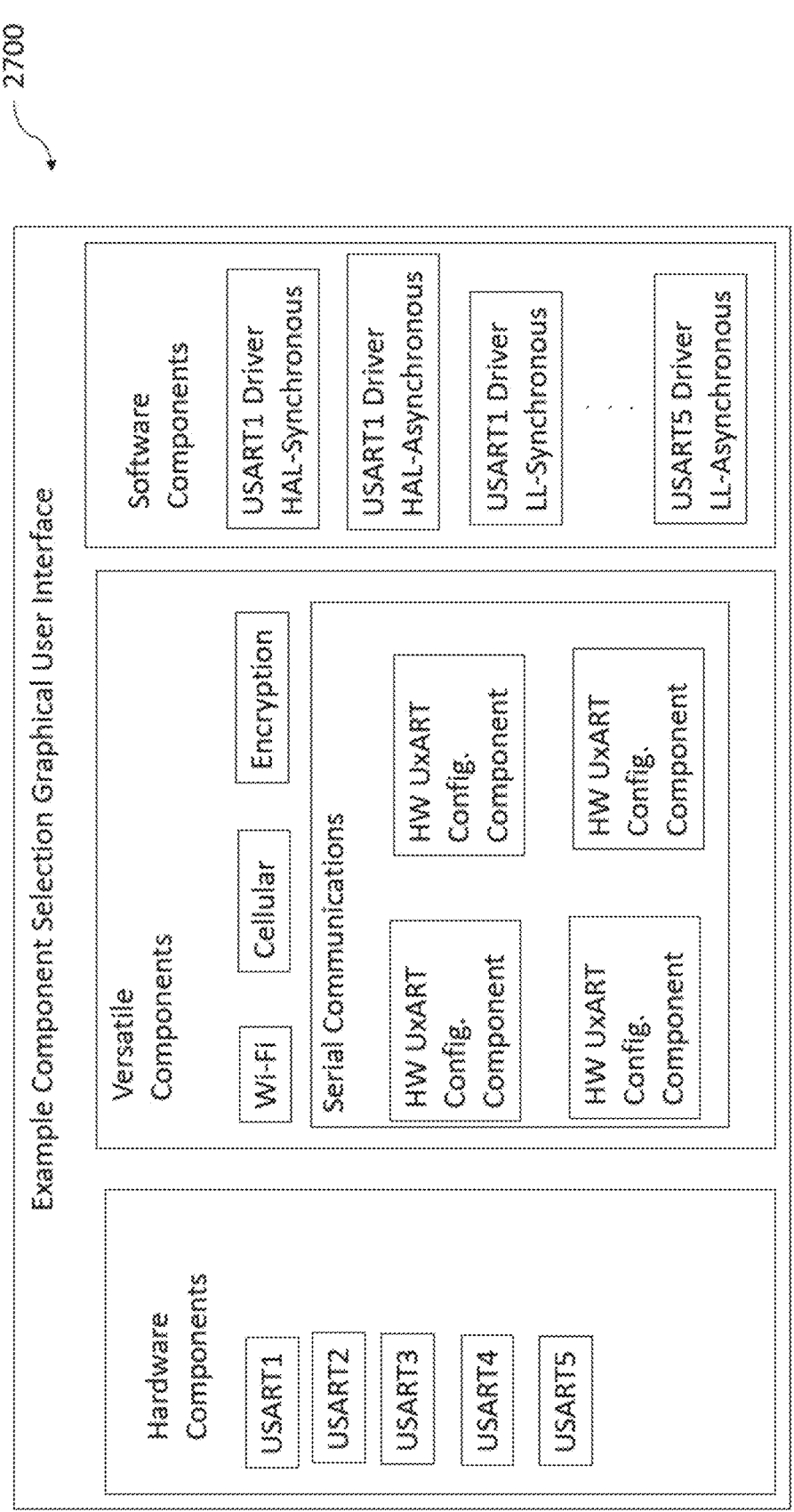
FIG. 27 illustrates an example graphical user interface that may be presented to a user to facilitate the selection of a component to configure.

FIG. 27 illustrates an example graphical user interface 2700 that may be presented to a user to facilitate the selection of a component to configure, such as at block 2604 of FIG. 26. In this illustrative example, the graphical user interface 2700 may display a list of hardware components (e.g., specific hardware UxARTs of the programmable device, specific SPIs, specific I2Cs, etc.), a list of software components (e.g., specific drivers), and a list of versatile components for a project associated with a programmable computing device. As illustrated, the versatile components include functional types (e.g., Wi-Fi and Cellular, encryption, serial communication, etc.). As illustrated, the serial communication functionality includes multiple HW UxART configuration components to provide serial communication functionality. The functional types may be useful when a user knows what type of functionality is desired, but does not know or necessarily care which specific hardware components and software components (e.g., drivers) are used to provide the desired functionality. This facilitates using a versatile component configuration to generate more than one versatile component instance. The individual instances of a versatile component may then be associated with specific hardware components and software components.

Process 2600 continues at block 2606, where a user selection of a component of the list of components is received (e.g., via the graphical interface 2700 of FIG. 27). Process 2600 proceeds next to decision block 2608, where a determination is made whether the selected component is a versatile component. If the selected component is a versatile component, then process 2600 flows from block 2608 to block 2610; otherwise, process 2600 flows from block 2608 to block 2622. Processing at block 2622 may generally proceed as described above with reference to blocks 310 to 324 of FIG. 3 or with reference to blocks 910 to 950 of FIG. 9. Process 2600 proceeds from block 2622 to block 2624.

Figure 28:
FIG. 28 is an illustrative example of a graphical user interface to enable a user to select parameters for a user-selected versatile component in accordance with embodiments described herein.

At block 2610, configuration options for a selected versatile component are presented to the user, e.g., via a graphical user interface. FIG. 28 is an illustrative example of a graphical user interface 2800 to enable a user to select parameters for an instance of a user-selected versatile component in accordance with embodiments described herein. This graphical user interface 2800 can display different configurations and possible values for multiple parameters, depending on which configurable versatile component is selected by the user.

The type of user interfaces shown in FIGS. 27 and 28 can enable a user to progress through various different layers of components to select the appropriate components for their project. Moreover, this graphical user interface tool can help the end-user in resolving the dependencies by proposing appropriate components or by automatically selecting components when appropriate (e.g., when only one component is filling the criteria). FIGS. 27 and 28 are for illustrative purposes and should not be considered as limiting. Other information or data may be displayed to a user via the graphical user interfaces in accordance with embodiments described herein. Templates and hooks may be employed, such as discussed above with reference to FIGS. 3 and 9.

Process 2600 proceeds from block 2610 to block 2612, where user-selected option selections for a selected versatile component instance are received (e.g., with reference to FIG. 28, selections for HW UxART Inst1). Process 2600 continues from block 2612 to block 2614, where settings for an instance of the selected versatile component are generated based on the received versatile component configuration option selections, which may include employing templates and hooks. This may be done, for example, as discussed above with reference to block 948 of FIG. 9.

Process 2600 proceeds from block 2614 to block 2616, where the instance of the versatile component is associated with a hardware component and with a software component based on one or more of the received versatile component configuration option selections or the generated settings for the versatile component instance. For example, the received versatile component configuration option selections for the versatile component instance may only be compatible with a single hardware component (e.g., USART1), or with a single software component (e.g., IrDA/HAL driver for USART1), or may be compatible with several hardware components or software components, and a selection criteria may be employed (e.g., to avoid associating a low-speed function with a higher-speed UART than needed for the function). In some embodiments, a graphical user interface may be employed to present the available options to the user, and to receive user selections. The association of a versatile component instance with a hardware component or a software component may be implemented using one or more hooks, which may be employed during the content generation process as discussed above with respect to FIGS. 9-21.

Process 2600 continues from block 2616 to block 2618, where the configuration store 222 is generated or updated based on the settings for the versatile component instance, and any settings for the code generation strategy for the versatile component instance, for the associated hardware component, for the associated software component, or combinations thereof. This may be done, for example, as discussed above with reference to block 950 of FIG. 9.

Process 2600 proceeds from block 2618 to decision block 2620, where a determination is made whether the user is to select another component to configure. If another component is selected, process 2600 loops from block 2620 to block 2604 to present a list of components to configure; otherwise, process 2600 flows from block 2620 to block 2624. Process 2600 may also be performed with the user selecting multiple components, which can then be configured by the user together or individually.

At block 2624, the content generated for each user-selected component is built into one or more binary images for the project. A binary image is the information usable by the programmable computing device to initialize, configure, or control its hardware, software, or a combination thereof. In some embodiments, all generated content is utilized to build the binary image for the project. In other embodiments, a portion, but not all of the generated content, is utilized to build the binary image for the project. For example, in the case of interpreted languages, only specific content (e.g., generated code) may be uploaded in a specific memory region of the programmable computing device without regenerating the binary interpreting it.

As illustrated, process 2600 proceeds from block 2624 to block 2626, where the binary image(s) is provided to the programmable computing device. In some embodiments, process 2600 may sometimes return to block 2604 from block 2626, using the content generated at 2626 as an intermediate input to the process. In some embodiments, process 2600 may be executed multiple times to generate different content for different configurations of the programmable computing device. In this way, different configurations can be provided to separate programmable computing devices (even if a same type of programmable computing device), or different configurations can be provided to a single programmable computing device to allow a user of the programmable computing device to change between the different configurations. After block 2626, process 2600 terminates at block 2628, or otherwise returns to a calling process to perform other actions.

Embodiments of the process 2600 illustrated in FIG. 26 may have more process blocks than illustrated, may have fewer process blocks than illustrated, and the process flow may be modified in various ways. For example, process 2600 may be modified to include a block presenting configuration update information to the user based on the updated configuration store at 2618 (e.g., calling the process 400). In another example, associating an instance of a versatile component with hardware or software components of process block 2616 may be combined in whole or in part with process block 2614, in whole or in part with process block 2618, in whole or in part with process block 2624, or split between process blocks 2614, 2618 and 2624 in various combinations in some embodiments. In another example, the process flow may include parallel processing of process blocks, instead of sequential processes as described.

The embodiments described herein may be considered as employing two principles to generate content for programmable computing devices: componentization and the use of embedded software. The embedded software is organized in CMSIS packs and components. The embedded software uses tool disentanglement and data centric architecture for tools. The embedded software components provide to the tools what is needed for the tools to use the embedded software, which includes the elements for configuring a software component.

Some users may leverage embodiments of the disclosed content generation systems to generate content for programmable devices, using the available tools and configuration possibilities. Other users may prefer a file-based approach, not using the configuration tools. Other users may prefer a hybrid approach. To facilitate the different user preferences, and as mentioned above, components may be classified into ready-to-go components and configurable components.

The ready-to-go components generally are not configurable and may provide, for example, plain C code, which may be a driver (e.g.: HAL CRC) or any other piece of software. Ready-to-go components generally may be used in standalone mode. It is noted that ready-to-go components may have limited configurability.

In an embodiment, the configurable components may be classified into subcategories: configuration components; self-contained configurable components; and hybrid components.

The configuration components are used to configure the ready-to-go components. The configuration components generally are not used in standalone mode, and have a dependency on the services provided by the ready-to-go component they are used to configure. For instance, a CRC configuration component facilitates defining CRC parameters, but the actual code piloting the CRC IP is provided by a "ready-to-go" component (e.g., a HAL CRC). The configuration components may generate initialization (respectively deinitialization), object retrieval, and configuration code.

The self-contained configurable components contain both the code implementing the services they provide, and the elements used to configure these services. This is typically the case for middleware components, providing the middleware code as well as the configuration artefacts. For self-contained configurable components, a component per component choice nay be used to determine if configuration is mandatory or optional. Self-contained configurable components may have dependencies on other components, regardless of configuration.

The hybrid configurable components may be configured via a configuration component generating a code calling the APIs of a hybrid configurable component, as well as via a configuration mechanism of the hybrid component, which may typically employ compiler switches.

The configurable components can support different configuration techniques, such as standard techniques defined by Open-CMSIS, which are usually based on copies of files in a user-controlled space. This can be complemented by the addition of standard techniques like wizard annotations.

The configurable components may also employ configuration techniques of the embodiments described herein. To the extent the techniques of the described embodiments are not supported by Open-CMSIS only compliant tools, the techniques may be described in a valid Open-CMSIS syntax to avoid generating issues in such tools. Some users can also implement their own configuration techniques and integrate the techniques in systems employing the disclosed embodiments. For example, user-defined configuration panels may be integrated as an extension in the defined user-interfaces of the described embodiments; user-specified code generation services may be integrated into the content generation processes of the described embodiments; etc.

In some embodiments, provided components may be defined according to the OpenCMSIS technology, and may facilitate the use and leveraging of OpenCMSIS configuration techniques. At a component level, some files may be defined as configuration files (see the "attr=config" attribute of a file element), which may be copied in the project components area (RTE folder in OpenCMSIS reference tools) and may become user-controlled files. At a component level, some files may be defined as template files, and may be copied in the project user area (e.g., by the end-user with the OpenCMSIS reference tools) and become user-controlled files. These files may be considered as reference applicative code, rather than plain configuration files. A component can be instantiable (see the 'maxInstances' attribute of a component element): the OpenCMSIS reference tools may make as many copies (adding a numbering suffix to the file name) as instances of the files tagged as "config".

The embodiments disclosed herein can be used by any software component (configuration component or configurable component) and may provide with a component, for example, (i) a description of how the component can be configured: possible parameters with values and constraints; (ii) a description of how to apply the user's configuration choices in the project code: generated code templates; (iii) optionally, some specific procedures and snippets referenced in the code generation template files (e.g.: partials, helpers); (iv) rule(s) to tell the code generation tool how to generate the outputs (a.k.a. "hook"); (v) reference(s) to the code generation tool to facilitate converting the user's choices into code (a.k.a. "generator"); and (vi) descriptions of how to update the component's definition and the related conditions: gpdsc template.

In an embodiment, the embedded software components may be implemented, for example, via: (i) JSON files describing the configurability of the component (a.k.a. parameters.json): these files may be processed by a software configurator; (ii) handlebars template files as generated code templates: these files may be used by a code generation service; (iii) JavaScript helper functions and handlebars partials as procedures and snippets: these files may be used by templates; (iv) JavaScript "hook" functions invoked by the code generation tool to determine the output to be produced (a default strategy may be to group all code dealing with the same hardware instance in one single file): this hook may be used by the code generation service; (v) a script (.bat or .sh for instance) calling the a code generation service: this script may be used by a project manager; and (vi) Handlebars template files for the .gpdsc file: this file may be used by the code generation service.

The configuration components mentioned above may be classified into two subcategories: standard configuration components and versatile configuration components as disclosed herein. Both may Expose several API layers (example: HAL and LL): 1 software instance uses 1 layer only.

Support instantiation: software instances can be defined within these components. A software instance typically handles one hardware instance.

Support multi-configuration for each software instance (and configurations associated to a software instance typically use the same API layer and the same hardware instance).

The configuration components may realize the mapping of the software instances to the hardware instances by relying on the instantiation possibility offered by the OpenCMSIS specification. So, the configuration components are instantiable (they have a "maxInstances" attributes greater than 1). This means that a user can create several software instances configuring the same hardware instance for different functionalities or the same functionality.

A standard configuration component offers a single functionality of a hardware IP. In contrast, a versatile configuration component may expose all the functionality of a hardware IP: all the functionalities of a hardware instance can be managed by several software instances in the same versatile configuration component composition entity.

For the standard configuration component, a filter may be applied to propose the compatible hardware instances for resource selection (example: a Sync UART standard component will propose USART hardware instances). A standard configuration component can have several software instances which handle the same unique functionality. As many standard components as functionalities to be exposed may be declared:

Standard Component function A

Standard Component function B

. . .

Standard Component function N

Each software instance is dedicated to one hardware instance.

For example:

Standard configuration component for asynchronous UART with UART1 for all configurations Standard configuration component for synchronous UART with UART2 for all configurations Standard configuration component for Smartcard with UART3 for all configurations Standard configuration component for IrDA with UART4 for all configurations Standard configuration component for UART (Local Interconnect Network) with UART5 for all configurations A same hardware instance can be associated to several software instances from different standard configuration components, through one single reference. One software instance can be active at a point in time.

The versatile configuration components disclosed herein facilitate using flexible content generation approaches, such as those illustrated in FIGS. 25 and 26. A versatile configuration component can have several software instances. Each of these software instances handles the same unique functionality. One versatile configuration component may be declared for all the functionalities to be exposed:

Versatile Component PPP covers function A,

Versatile Component PPP covers function B too,

. . . ,

Versatile Component PPP covers function N too.

Each software instance is dedicated to one hardware instance. For example:

Versatile configuration component for UxART, software instance #1 with UART1 for all configurations Versatile configuration component for UxART, software instance #2 with UART2 for all configurations Versatile configuration component for UxART, software instance #3 with UART3 for all configurations Versatile configuration component for UxART, software instance #4 with UART4 for all configurations Versatile configuration component for UxART, software instance #5 with UART5 for all configurations A same hardware instance can be associated to several software instances from the same versatile configuration component through one single reference. One software instance can be active at a point in time.

Typically, a versatile configuration component for PPP=UART and another for PPP=USART would not be employed. Instead, a versatile configuration component covering PPP=UxART would be employed. Of course, if a HW instance cannot offer a functionality (for instance UART1 cannot offer the synchronous function), then this function is not available for the software instance of a versatile configuration component associated to this hardware instance.

In an embodiment, a method comprises: presenting, via a graphical user interface to a user, a list of components for a project associated with a programmable computing device; receiving, via the graphical user interface, a first selection of a user-selected component for the project from the list of components; in response to the user-selected component being configurable: presenting, via the graphical user interface, user-selectable component configuration options for the user-selected component; receiving, via the graphical user interface, component configuration option selections for the user-selected component; presenting, via the graphical user interface, user-selectable code generation strategy options for the user-selected component; receiving, via the graphical user interface, code generation strategy option selections for the user-selected component; generating settings for the user-selected component based on the received component configuration option selections and the received code generation strategy option selections for the user-selected component; and generating or updating a configuration store based on the settings for the user-selected component; and generating content for the programmable computing device based on the user-selected component and the configuration store, the generating content including generating, updating or retrieving a code generation strategy parameters file and generating code associated with the user-selected component based on the code generation strategy parameters file.

In an embodiment, the generating, updating or retrieving the code generation strategy parameters file includes invoking a code generation strategy descriptor service. In an embodiment, the generating, updating or retrieving the code generation strategy parameters file comprises executing code provided by the code generation strategy descriptor service. In an embodiment, the executing the code provided by the code generation strategy descriptor service comprises generating an object specifying a selected code generation strategy for the user-selected component. In an embodiment, the generating code associated with the user-selected component based on the code generation strategy parameters file comprises generating code based on the object. In an embodiment, the executing the code provided by the code generation strategy descriptor service comprises retrieving code generation strategy settings associated with the selected user component from the configuration store.

In an embodiment, the method comprises: providing the content to the programmable computing device.

In an embodiment, the presenting, via the graphical user interface, user-selectable component configuration options for the user-selected component comprises: presenting, via the graphical user interface, a first list of user-selectable templates for the user-selected component; and presenting, via the graphical user interface, a second list of user-selectable parameters for the user-selected component; and the receiving, via the graphical user interface, component configuration option selections for the user-selected component comprises: receiving, via the graphical user interface, a second selection of at least one user-selected template from the first list of user-selectable templates; and receiving, via the graphical user interface, a third selection of at least one user-selected parameter from the second list of user-selectable parameters.

In an embodiment, the presenting, via the graphical user interface, user-selectable code generation strategy options of the user-selected component comprises invoking a code generation strategy descriptor service.

In an embodiment, the presenting, via the graphical user interface, user-selectable code generation strategy options for the user-selected component comprises: presenting, via the graphical user interface, a first list of user-selectable code generation strategy templates for the user-selected component; and presenting, via the graphical user interface, a second list of user-selectable code generation strategy parameters for the user-selected component; and the receiving, via the graphical user interface, code generation strategy option selections for the user-selected component comprises: receiving, via the graphical user interface, a second selection of at least one user-selected code generation strategy template from the first list of user-selectable templates; and receiving, via the graphical user interface, a third selection of at least one user-selected code generation strategy parameter from the second list of user-selectable parameters.

In an embodiment, the method comprises: presenting, via the graphical user interface, a first list of user-selectable configuration templates for the user-selected component; and receiving, via the graphical user interface, a second selection of a user-selected template from the first list of user-selectable configuration templates for the user-selected component, wherein the selected template defines: component configuration option selections for the user-selected component; code generation strategy option selections for the user-selected component; or component configuration option selections for the user-selected component and code generation strategy option selections for the user-selected component.

In an embodiment, generating the content comprises: generating initialization code that initializes software of the programmable computing device based on the code generation strategy parameters file.

In an embodiment, generating the content comprises: generating initialization code that initializes hardware of the programmable computing device based on the code generation strategy parameters file.

In an embodiment, generating the content comprises: generating application code that controls software of the programmable computing device based on the code generation strategy parameters file.

In an embodiment, a non-transitory computer-readable medium's contents configure a processing device to perform a method. The method comprises: displaying, via a graphical user interface to a user, a list of components for a project associated with a programmable computing device; receiving, via the graphical user interface, a first selection of a user-selected component for the project from the list of components; in response to the user-selected component being configurable: displaying, via the graphical user interface, user-selectable component configuration options for the user-selected component; receiving, via the graphical user interface, component configuration option selections for the user-selected component; displaying, via the graphical user interface, user-selectable code generation strategy options for the user-selected component; receiving, via the graphical user interface, code generation strategy option selections for the user-selected component; generating settings for the user-selected component based on the received component configuration option selections and the received code generation strategy option selections for the user-selected component; and generating or updating a configuration store based on the settings for the user-selected component; and generating content for the programmable computing device based on the user-selected component and the configuration store, the generating content including generating, updating or retrieving a code generation strategy parameters file and generating code associated with the user-selected component based on the code generation strategy parameters file. In an embodiment, the method comprises: providing the generated content to the programmable computing device. In an embodiment, the contents of the computer-readable medium comprise instructions executable by the processing device. In an embodiment, the generating, updating or retrieving the code generation strategy parameters file includes invoking a code generation strategy descriptor service. In an embodiment, the generating, updating or retrieving the code generation strategy parameters file comprises executing code provided by the code generation strategy descriptor service. In an embodiment, the executing the code provided by the code generation strategy descriptor service comprises generating an object specifying a selected code generation strategy for the user-selected component. In an embodiment, the generating code associated with the user-selected component based on the code generation strategy parameters file comprises generating code based on the object. In an embodiment, the executing the code provided by the code generation strategy descriptor service comprises retrieving code generation strategy settings associated with the selected user component from the configuration store.

In an embodiment, a computing device comprises: a display device; a memory, which, in operation, stores computer instructions; and at least one processor, which, in operation, executes the computer instructions. The computer instructions are executed to: present, via the display device and to a user, a list of components for a project associated with a programmable computing device; receive a first selection of a user-selected component for the project from the list of components; in response to the user-selected component being configurable: display, via the display device, user-selectable component configuration options for the user-selected component; receive component configuration option selections for the user-selected component; display user-selectable code generation strategy options for the user-selected component; receive code generation strategy option selections for the user-selected component; generate settings for the user-selected component based on the received component configuration option selections and the received code generation strategy option selections for the user-selected component; and generate or update a configuration store based on the settings for the user-selected component; and generate content for the programmable computing device based on the user-selected component and the configuration store, the generating content including generating, updating or retrieving a code generation strategy parameters file and generating code associated with the user-selected component based on the code generation strategy parameters file. In an embodiment, the at least one processor, in operation, executes the computer instructions to: provide the content to the programmable computing device. In an embodiment, the generating, updating or retrieving the code generation strategy parameters file includes invoking a code generation strategy descriptor service. In an embodiment, the generating, updating or retrieving the code generation strategy parameters file comprises executing code provided by the code generation strategy descriptor service. In an embodiment, generating the content comprises: generating initialization code that initializes software of the programmable computing device based on the code generation strategy parameters file; generating initialization code that initializes hardware of the programmable computing device based on the code generation strategy parameters file; generating application code that controls software of the programmable computing device based on the code generation strategy parameters file; or combinations thereof.

In an embodiment, a system comprises: a programmable computing device; and a non-transitory computer-readable medium having contents, which, in operation, cause a processor to: present, via a graphical user interface to a user, a list of components for a project associated with the programmable computing device; receive, via the graphical user interface, a first selection of a user-selected component for the project from the list of components; in response to the user-selected component being configurable: display, via the graphical user interface, user-selectable component configuration options for the user-selected component; receive, via the graphical user interface, component configuration option selections for the user-selected component; display, via the graphical user interface, user-selectable code generation strategy options for the user-selected component; receive, via the graphical user interface, code generation strategy option selections for the user-selected component; generate settings for the user-selected component based on the received component configuration option selections and the received code generation strategy option selections for the user-selected component; and generate or update a configuration store based on the settings for the user-selected component; generate content for the programmable computing device based on the user-selected component and the configuration store, the generating content including generating, updating or retrieving a code generation strategy parameters file and generating code associated with the user-selected component based on the code generation strategy parameters file; and provide the content to the programmable computing device. In an embodiment, the programmable computing device comprises: a microprocessor which, in operation, executes the content to initialize software of the programmable computing device. In an embodiment, the programmable computing device comprises: a microprocessor which, in operation, executes the content to initialize hardware of the programmable computing device. In an embodiment, the programmable computing device comprises: a microprocessor which, in operation, executes the content as a software application of the programmable computing device. In an embodiment, the generating, updating or retrieving the code generation strategy parameters file includes invoking a code generation strategy descriptor service. In an embodiment, the generating updating or retrieving the code generation strategy parameters file comprises executing code provided by the code generation strategy descriptor service. In an embodiment, the executing the code provided by the code generation strategy descriptor service comprises generating an object specifying a selected code generation strategy for the user-selected component.

In an embodiment, a method comprises: presenting, via a graphical user interface to a user, a list of versatile components for a project associated with a programmable computing device; receiving, via the graphical user interface, a selection of a user-selected versatile component for the project from the list of versatile components; presenting, via the graphical user interface, user-selectable versatile component configuration options for the user-selected versatile component; receiving, via the graphical user interface, versatile component configuration option selections for the user-selected versatile component; generating settings for a first instance of the user-selected versatile component based on the received versatile component configuration option selections; generating or updating a configuration store based on the generated settings for the first instance of the user-selected versatile component; and generating content for the programmable computing device based on the configuration store, wherein at least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections.

In an embodiment, the method comprises: providing the generated content to the programmable computing device.

In an embodiment, the presenting, via the graphical user interface, user-selectable versatile component configuration options for the user-selected versatile component comprises: presenting, via the graphical user interface, a list of user-selectable functionality options for user-selected versatile component; and presenting, via the graphical user interface, a list of user-selectable application programming interface (API) options for the user-selected versatile component; and the receiving, via the graphical user interface, versatile component configuration option selections for the user-selected versatile component comprises: receiving, via the graphical user interface, a selection of one or more functionality options from the list of user-selectable functionality options; and receiving, via the graphical user interface, a selection of one or more API options from the list of user-selectable API options.

In an embodiment, the first instance of the user-selected versatile component is associated with a software component and with a hardware component of the programmable computing device based on one or more of the received versatile component configuration option selections, and the method includes: generating a list of software components based on the one or more of the received versatile component configuration option selections; presenting, via the graphical user interface, the generated list of software components; receiving, via the graphical user interface, a selection of a software component from the generated list of software components; associating the first instance of the user-selected versatile component with the selected software component; generating a list of hardware components based on the one or more of the received versatile component configuration option selections; presenting, via the graphical user interface, the generated list of hardware components; receiving, via the graphical user interface, a selection of a specific hardware component from the generated list of hardware components; and associating the first instance of the user-selected versatile component with the selected hardware component. In an embodiment, the method comprises generating the list of hardware components based on the selected software component. In an embodiment, the method comprises generating the list of software components based on the selected hardware component. In an embodiment, generating the content comprises: generating initialization code that initializes software of the programmable computing device based on the configuration store.

In an embodiment, generating the content comprises: generating initialization code that initializes hardware of the programmable computing device based on the configuration store. In an embodiment, generating the content comprises: generating application code that controls software of the programmable computing device based on the configuration store.

In an embodiment, the first instance of the user-selected versatile component is associated with a single hardware component of the programmable computing device. In an embodiment, the first instance of the user-selected versatile component is associated with a single software component of the programmable computing device.

In an embodiment, the method comprises associating a second instance of a user-selected versatile component with the hardware component of the programmable computing device associated with the first instance of the user-selected versatile component. In an embodiment, the method comprises associating a second instance of a user-selected versatile component with the software component of the programmable computing device associated with the first instance of the user-selected versatile component.

In an embodiment, the method comprises: presenting, via the graphical user interface, user-selectable code generation strategy options for the first instance of the user-selected versatile component; receiving, via the graphical user interface, code generation strategy option selections for the first instance of the user-selected versatile component; generating content for the programmable computing device based on the code generation strategy option selections for the first instance of the user-selected versatile component. In an embodiment, the generating content includes invoking a code generation strategy descriptor service.

In an embodiment, the code generation strategy option selections specify, a hardware component of the programmable computing device to associate with the first instance of the user-selected versatile component; a software component of the programmable computing device to associate with the first instance of the user-selected versatile component; or a hardware component of the programmable computing device to associate with the first instance of the user-selected versatile component and a software component of the programmable computing device to associate with the first instance of the user-selected versatile component.

In an embodiment, the method comprises: updating the settings for the first instance of the user-selected versatile component based on settings associated with a second instance of a user-selected versatile component; updating the association of the first instance of the user-selected versatile component with a software component based on settings associated with the second instance of a user-selected versatile component; updating the association of the first instance of the user-selected versatile component with a hardware component based on settings associated with the second instance of a user-selected versatile component; or combinations thereof.

In an embodiment, the method comprises: updating the configuration store; and generating content for the programmable computing device based on the updated configuration store.

In an embodiment, a non-transitory computer-readable medium's contents configure a processing device to perform a method. The method comprises: presenting, via a graphical user interface to a user, a list of versatile components for a project associated with a programmable computing device; receiving, via the graphical user interface, a first selection of a user-selected versatile component for the project from the list of versatile components; presenting, via the graphical user interface, user-selectable versatile component configuration options for the user-selected versatile component; receiving, via the graphical user interface, versatile component configuration option selections for the user-selected versatile component; generating settings for a first instance of the user-selected versatile component based on the received versatile component configuration option selections; generating or updating a configuration store based on the settings for the first instance of the user-selected versatile component; and generating content for the programmable computing device based on the configuration store, wherein at least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections. In an embodiment, the method comprises: providing the generated content to the programmable computing device. In an embodiment, the contents of the computer-readable medium comprise instructions executable by the processing device. In an embodiment, the method comprises invoking a code generation strategy descriptor service. In an embodiment, the method comprises executing code provided by the code generation strategy descriptor service. In an embodiment, the executing the code provided by the code generation strategy descriptor service comprises generating an object specifying a selected code generation strategy for the first instance of the user-selected versatile component. In an embodiment, the selected code generation strategy for the first instance of the user-selected versatile component specifies, a hardware component of the programmable computing device to associate with the first instance of the user-selected versatile component; a software component of the programmable computing device to associate with the first instance of the user-selected versatile component; or a hardware component of the programmable computing device to associate with the first instance of the user-selected versatile component and a software component of the programmable computing device to associate with the first instance of the user-selected versatile component.

In an embodiment, a computing device, comprises: a display device; a memory, which, in operation, stores computer instructions; and at least one processor. The at least one processor, in operation, executes the computer instructions to: present, via a graphical user interface to a user, a list of versatile components for a project associated with a programmable computing device; receive, via the graphical user interface, a first selection of a user-selected versatile component for the project from the list of versatile components; present, via the graphical user interface, user-selectable versatile component configuration options for the user-selected versatile component; receive, via the graphical user interface, versatile component configuration option selections for the user-selected versatile component; generate settings for a first instance of the user-selected versatile component based on the received versatile component configuration option selections; generate or update a configuration store based on the settings for the first instance of the user-selected versatile component; and generate content for the programmable computing device based on the configuration store, wherein at least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections. In an embodiment, the at least one processor, in operation, executes the computer instructions to: provide the generated content to the programmable computing device. In an embodiment, an object in the configuration store specifies: a hardware component of the programmable computing device to associate with the first instance of the user-selected versatile component; a software component of the programmable computing device to associate with the first instance of the user-selected versatile component; or a hardware component of the programmable computing device to associate with the first instance of the user-selected versatile component and a software component of the programmable computing device to associate with the first instance of the user-selected versatile component.

In an embodiment, a system comprises: a programmable computing device; and a non-transitory computer-readable medium having contents, which, in operation, cause a processor to: present, via a graphical user interface to a user, a list of versatile components for a project associated with the programmable computing device; receive, via the graphical user interface, a first selection of a user-selected versatile component for the project from the list of versatile components; present, via the graphical user interface, user-selectable component configuration options for the user-selected versatile component; receive, via the graphical user interface, component configuration option selections for the user-selected versatile component; generate settings for a first instance of the user-selected versatile component based on the received component configuration option selections; generate or update a configuration store based on the settings for the first instance of the user-selected versatile component; and generate content for the programmable computing device based on the configuration store, wherein at least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections. In an embodiment, the programmable computing device comprises: a microprocessor which, in operation, executes at least a portion of the generated content to initialize software of the programmable computing device. In an embodiment, the programmable computing device comprises: a microprocessor which, in operation, executes at least a portion of the generated content to initialize hardware of the programmable computing device. In an embodiment, the programmable computing device comprises: a microprocessor which, in operation, executes at least a portion of the generated content as a software application of the programmable computing device. In an embodiment, an object in the configuration store specifics: a hardware component of the programmable computing device to associate with the first instance of the user-selected versatile component; a software component of the programmable computing device to associate with the first instance of the user-selected versatile component; or a hardware component of the programmable computing device to associate with the first instance of the user-selected versatile component and a software component of the programmable computing device to associate with the first instance of the user-selected versatile component.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

presenting, via a graphical user interface to a user, a list of versatile components for a project associated with a programmable computing device;

receiving, via the graphical user interface, a selection of a user-selected versatile component for the project from the list of versatile components;

presenting, via the graphical user interface, user-selectable versatile component configuration options for the user-selected versatile component;

receiving, via the graphical user interface, versatile component configuration option selections for the user-selected component;

generating settings for a first instance of the user-selected versatile component based on the received versatile component configuration option selections;

generating or updating a configuration store based on the generated settings for the first instance of the user-selected versatile component; and generating content for the programmable computing device based on the configuration store, wherein at least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections.

2. The method of claim 1, comprising:

providing the generated content to the programmable computing device.

3. The method of claim 1, wherein, the presenting, via the graphical user interface, user-selectable versatile component configuration options for the user-selected versatile component comprises:

presenting, via the graphical user interface, a list of user-selectable functionality options for user-selected versatile component; and presenting, via the graphical user interface, a list of user-selectable application programming interface (API) options for the user-selected versatile component; and the receiving, via the graphical user interface, versatile component configuration option selections for the user-selected versatile component comprises:

receiving, via the graphical user interface, a selection of one or more functionality options from the list of user-selectable functionality options; and receiving, via the graphical user interface, a selection of one or more API options from the list of user-selectable API options.

4. The method of claim 1, wherein the first instance of the user-selected versatile component is associated with a software component and with a hardware component of the programmable computing device based on one or more of the received versatile component configuration option selections, and the method includes:

generating a list of software components based on the one or more of the received versatile component configuration option selections;

presenting, via the graphical user interface, the generated list of software components;

receiving, via the graphical user interface, a selection of a software component from the generated list of software components;

associating the first instance of the user-selected versatile component with the selected software component;

generating a list of hardware components based on the one or more of the received versatile component configuration option selections;

presenting, via the graphical user interface, the generated list of hardware components;

receiving, via the graphical user interface, a selection of a specific hardware component from the generated list of hardware components; and associating the first instance of the user-selected versatile component with the selected hardware component.

5. The method of claim 1, wherein generating the content comprises:

generating initialization code that initializes software of the programmable computing device based on the configuration store.

6. The method of claim 1, wherein generating the content comprises:

generating initialization code that initializes hardware of the programmable computing device based on the configuration store.

7. The method of claim 1, wherein generating the content comprises:

generating application code that controls software of the programmable computing device based on the configuration store.

8. The method of claim 1, wherein the first instance of the user-selected versatile component is associated with a single hardware component of the programmable computing device.

9. The method of claim 1, comprising associating a second instance of a user-selected versatile component with the hardware component of the programmable computing device associated with the first instance of the user-selected versatile component.

10. The method of claim 1, comprising associating a second instance of a user-selected versatile component with the software component of the programmable computing device associated with the first instance of the user-selected versatile component.

11. The method of claim 1, comprising:

presenting, via the graphical user interface, user-selectable code generation strategy options for the first instance of the user-selected versatile component;

receiving, via the graphical user interface, code generation strategy option selections for the first instance of the user-selected versatile component;

generating content for the programmable computing device based on the code generation strategy option selections for the first instance of the user-selected versatile component.

12. The method of claim 1, comprising:

updating the settings for the first instance of the user-selected versatile component based on settings associated with a second instance of a user-selected versatile component;

updating the association of the first instance of the user-selected versatile component with a software component based on settings associated with the second instance of a user-selected versatile component;

updating the association of the first instance of the user-selected versatile component with a hardware component based on settings associated with the second instance of a user-selected versatile component; or combinations thereof.

13. The method of claim 4, comprising generating the list of hardware components based on the selected software component.

14. The method of claim 4, comprising generating the list of software components based on the selected hardware component.

15. The method of claim 8, wherein the first instance of the user-selected versatile component is associated with a single software component of the programmable computing device.

16. The method of claim 11, wherein the generating content includes invoking a code generation strategy descriptor service.

17. The method of claim 11, wherein the code generation strategy option selections specify, a hardware component of the programmable computing device to associate with the first instance of the user-selected versatile component;

a software component of the programmable computing device to associate with the first instance of the user-selected versatile component; or a hardware component of the programmable computing device to associate with the first instance of the user-selected versatile component and a software component of the programmable computing device to associate with the first instance of the user-selected versatile component.

18. The method of claim 17, comprising:

updating the configuration store; and generating content for the programmable computing device based on the updated configuration store.

19. A non-transitory computer-readable medium having contents that configure a processing device to perform a method, the method comprising:

presenting, via a graphical user interface to a user, a list of versatile components for a project associated with a programmable computing device;

receiving, via the graphical user interface, a first selection of a user-selected versatile component for the project from the list of versatile components;

presenting, via the graphical user interface, user-selectable versatile component configuration options for the user-selected versatile component;

receiving, via the graphical user interface, versatile component configuration option selections for the user-selected versatile component;

generating settings for a first instance of the user-selected versatile component based on the received versatile component configuration option selections;

generating or updating a configuration store based on the settings for the first instance of the user-selected versatile component; and generating content for the programmable computing device based on the configuration store, wherein at least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections.

20. The non-transitory computer-readable medium of claim 19, wherein the method comprises:

providing the generated content to the programmable computing device.

21. The non-transitory computer-readable medium of claim 19, wherein the contents of the computer-readable medium comprise instructions executable by the processing device.

22. The non-transitory computer-readable medium of claim 19, wherein the method comprises invoking a code generation strategy descriptor service.

23. The non-transitory computer-readable medium of claim 22, wherein the method comprises executing code provided by the code generation strategy descriptor service.

24. The non-transitory computer-readable medium of claim 23, wherein the executing the code provided by the code generation strategy descriptor service comprises generating an object specifying a selected code generation strategy for the first instance of the user-selected versatile component.

25. The non-transitory computer-readable medium of claim 24, wherein the selected code generation strategy for the first instance of the user-selected versatile component specifies, a hardware component of the programmable computing device to associate with the first instance of the user-selected versatile component;

a software component of the programmable computing device to associate with the first instance of the user-selected versatile component; or a hardware component of the programmable computing device to associate with the first instance of the user-selected versatile component and a software component of the programmable computing device to associate with the first instance of the user-selected versatile component.

26. A computing device, comprising:

a display device;

a memory, which, in operation, stores computer instructions; and at least one processor, which, in operation, executes the computer instructions to:

present, via a graphical user interface to a user, a list of versatile components for a project associated with a programmable computing device;

receive, via the graphical user interface, a first selection of a user-selected versatile component for the project from the list of versatile components;

present, via the graphical user interface, user-selectable versatile component configuration options for the user-selected versatile component;

receive, via the graphical user interface, versatile component configuration option selections for the user-selected versatile component;

generate settings for a first instance of the user-selected versatile component based on the received versatile component configuration option selections;

generate or update a configuration store based on the settings for the first instance of the user-selected versatile component; and generate content for the programmable computing device based on the configuration store, wherein at least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections.

27. The computing device of claim 26, wherein the at least one processor, in operation, executes the computer instructions to:

provide the generated content to the programmable computing device.

28. The computing device of claim 26, wherein an object in the configuration store specifies:

a hardware component of the programmable computing device to associate with the first instance of the user-selected versatile component;

a software component of the programmable computing device to associate with the first instance of the user-selected versatile component; or a hardware component of the programmable computing device to associate with the first instance of the user-selected versatile component and a software component of the programmable computing device to associate with the first instance of the user-selected versatile component.

29. A system, comprising:

a programmable computing device; and a non-transitory computer-readable medium having contents, which, in operation, cause a processor to:

present, via a graphical user interface to a user, a list of versatile components for a project associated with the programmable computing device;

receive, via the graphical user interface, a first selection of a user-selected versatile component for the project from the list of versatile components;

present, via the graphical user interface, user-selectable component configuration options for the user-selected versatile component;

receive, via the graphical user interface, component configuration option selections for the user-selected versatile component;

generate settings for a first instance of the user-selected versatile component based on the received component configuration option selections;

generate or update a configuration store based on the settings for the first instance of the user-selected versatile component; and generate content for the programmable computing device based on the configuration store, wherein at least one of the generating settings for the first instance of the versatile component, or the generating or updating the configuration store, includes associating the first instance of the user-selected versatile component with a software component, associating the first instance of the user-selected versatile component with a hardware component of the programmable computing device, or combinations thereof, based on one or more of the received versatile component configuration option selections.

30. The system of claim 29, wherein the programmable computing device comprises:

a microprocessor which, in operation, executes at least a portion of the generated content to initialize software of the programmable computing device.

31. The system of claim 29, wherein the programmable computing device comprises:

a microprocessor which, in operation, executes at least a portion of the generated content to initialize hardware of the programmable computing device.

32. The system of claim 29, wherein the programmable computing device comprises:

a microprocessor which, in operation, executes at least a portion of the generated content as a software application of the programmable computing device.

33. The system of claim 29, wherein an object in the configuration store specifies:

a hardware component of the programmable computing device to associate with the first instance of the user-selected versatile component;

a software component of the programmable computing device to associate with the first instance of the user-selected versatile component; or a hardware component of the programmable computing device to associate with the first instance of the user-selected versatile component and a software component of the programmable computing device to associate with the first instance of the user-selected versatile component.

* * * * *